US010026265B1

(12) United States Patent
Billings et al.

(10) Patent No.: US 10,026,265 B1
(45) Date of Patent: Jul. 17, 2018

(54) SYSTEMS AND METHODS FOR ATTRIBUTING CASINO REVENUE TO THE ORIGINAL DEPOSITOR

(71) Applicant: Gamesys Ltd., London (GB)

(72) Inventors: Darse Billings, London (GB); Stefano Romano, London (GB); Louis Burrows, London (GB)

(73) Assignee: Gamesys, Ltd., London (GB)

( * ) Notice: Subject to any disclaimer, the term of this patent is extended or adjusted under 35 U.S.C. 154(b) by 0 days.

(21) Appl. No.: 15/059,297

(22) Filed: Mar. 2, 2016

Related U.S. Application Data

(60) Provisional application No. 62/126,866, filed on Mar. 2, 2015.

(51) Int. Cl.
*G07F 17/32* (2006.01)
*G06Q 20/06* (2012.01)
*G06Q 50/34* (2012.01)

(52) U.S. Cl.
CPC ..... *G07F 17/3255* (2013.01); *G06Q 20/0655* (2013.01); *G06Q 50/34* (2013.01); *G07F 17/3237* (2013.01); *G07F 17/3244* (2013.01); *G07F 17/3293* (2013.01)

(58) Field of Classification Search
CPC ............. G07F 17/3237; G07F 17/3244; G07F 17/3255; G07F 17/3239
See application file for complete search history.

(56) References Cited

U.S. PATENT DOCUMENTS

| 6,113,101 | A | 9/2000 | Wirth | |
|---|---|---|---|---|
| 7,361,085 | B2 * | 4/2008 | Packes, Jr. | G07F 17/32 463/16 |
| 7,878,896 | B2 | 2/2011 | Jorasch et al. | |
| 8,202,157 | B2 * | 6/2012 | Packes, Jr. | G07F 17/32 273/138.1 |
| 8,876,608 | B2 * | 11/2014 | Shepherd | G07F 17/32 463/25 |

(Continued)

OTHER PUBLICATIONS

Website: "The PokerBank" www.thepokerbank.com/raceback/types/; download date Jan. 26, 2017; 9 pps.

(Continued)

*Primary Examiner* — David Duffy
(74) *Attorney, Agent, or Firm* — Fincham Downs, LLC; Madgalena M. Fincham

(57) ABSTRACT

In accordance with some embodiments, methods and systems provide for tagging an amount of virtual currency with a source identifier that identifies the player who originally deposits the virtual currency with an online gaming establishment. Thereafter, as the tagged virtual currency is used for wagering, and fragmented into smaller units as sub-amounts of it are wagered and lost to other players, the tag comprising the source identifier persists or is generated and associated anew with each such sub-unit as the sub-amount of virtual currency is moved to virtual wagering stacks of other players. This allows for crediting the player who originally deposited virtual currency with the online gaming establishment for revenue to the gaming establishment as the virtual currency is wagered (whether by the originally depositing player or subsequent players who win the virtual currency so tagged and then re-wager it on subsequent game events).

17 Claims, 9 Drawing Sheets

(56) References Cited

U.S. PATENT DOCUMENTS

| | | | |
|---|---|---|---|
| 8,956,220 B2* | 2/2015 | Melton | G07F 17/3276 |
| | | | 463/25 |
| 2002/0065123 A1* | 5/2002 | Packes, Jr. | G07F 17/32 |
| | | | 463/16 |
| 2006/0058087 A1 | 3/2006 | White et al. | |
| 2006/0058089 A1 | 3/2006 | White et al. | |
| 2007/0045958 A1 | 3/2007 | Rader et al. | |
| 2008/0153585 A1* | 6/2008 | Packes | G07F 17/32 |
| | | | 463/25 |
| 2008/0188308 A1* | 8/2008 | Shepherd | G07F 17/32 |
| | | | 463/39 |
| 2010/0093428 A1 | 4/2010 | Mattice et al. | |
| 2014/0004926 A1* | 1/2014 | Melton | G07F 17/3293 |
| | | | 463/25 |

OTHER PUBLICATIONS

Website: "Different methods to rake a poker game" http://mysocialpoker.com/resources/methods-to-rake-a-poker-game/ Jan. 19, 2011; download date Jan. 26, 2017; 7 pps.

Website: "Rake Methods Explained" www.pokervip.com/strategy-articles/maximize-your-poker-earnings/rake-methods- . . . ; download date Jan. 26, 2017; 4 pps.

Website: "Dealt Rake Method and Rakeback" www.rakemeback.com/dealt-rake-method; download date Jan. 26, 2017; 4 pps.

\* cited by examiner

SYSTEMS AND METHODS FOR ATTRIBUTING CASINO REVENUE TO THE ORIGINAL DEPOSITOR

CLAIM OF PRIORITY

The present application claims the benefit of U.S. Provisional Application No. 62/126,866 filed on Mar. 2, 2015 in the name of Billings et al. and titled SYSTEMS AND METHODS FOR ATTRIBUTING CASINO REVENUE TO THE ORIGINAL DEPOSITOR. The entirety of this provisional application is incorporated by reference herein for all purposes.

BRIEF DESCRIPTION OF THE FIGURES

The present description refers to various illustrative figures, of which.

DETAILED DESCRIPTION OF EXAMPLE EMBODIMENTS

Figure 1:
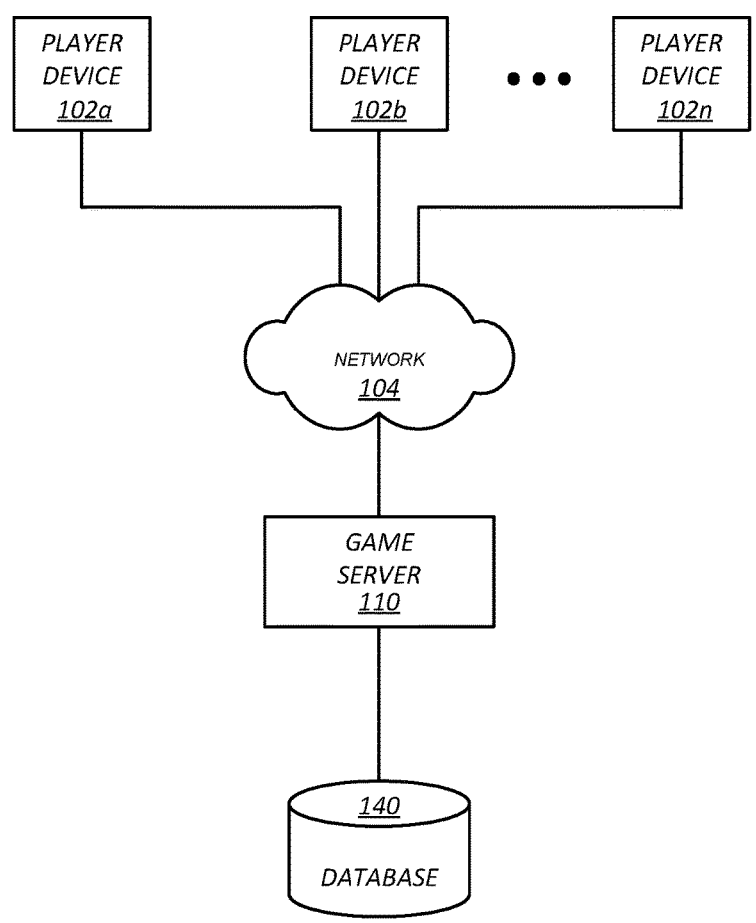
FIG. 1 is a schematic diagram of an embodiment of a gaming system in accordance with one or more embodiments described herein.

Many gaming establishments assign, calculate, determine and/or update (collectively "determine" herein) a value to players who play games at the gaming establishments. Gaming establishments may use such "value of a player" to, for example, (i) provide rewards or incentives to players; (ii) assign a rating or category to a player (which may, in turn, be used to provide rewards or incentives to the players); and/or (iii) provide rewards or incentives to business partners who may have referred or directed the players to the gaming establishment. For example, a player who is associated with a relatively high value may be provided credits to use for playing games at the gaming establishment or other prizes (e.g., coupons for products or services, upgrades or benefits usable within games, products, entries into lotteries or other contests, etc.). In another example, a business partner (e.g., a third party website which serves as a portal via which players may access a website of a gaming establishment which is an online gaming establishment) may be rewarded via "cash back" or other prizes based on a value of one or more players (e.g., combined or average value of all players or a number of high value players) who accessed the gaming establishment website via the business partner.

One parameter based on which gaming establishments may determine a value of a player is revenue contributed by the player to the gaming establishment (e.g., in the form of money wagered, wagers lost or fees paid). For example, some gaming establishments which facilitate poker card games at least partially base a value determined for a player based on the player's contribution(s) to one or more "rakes" collected for respective hands of the poker game (a rake being a commission fee taken by a gaming establishment, generally 2 to 5 percent of the pot in each hand with a predetermined cap). Applicants have recognized, however, that conventional methodologies which attribute a player's contribution to the gaming establishment's revenue based on that player's contribution to a rake of a current hand, although simple, are inaccurate in terms of recognizing which players contribute the most revenue to a gaming establishment. For example, some conventional methodologies attribute value to players for paying rake with money that was actually previously won from another players in a previous hand and then re-wagered by the player. Applicants believe this is fundamentally wrong from the perspective of the overall poker ecology, because the losing players (who had lost to the player who is currently wagering with their losses on a current hand) are the original source of revenue, for both the gaming establishment and the player who is currently wagering. For example, in conventional methodologies for valuing a player based on that player's contribution to the gaming establishment's revenue, even though a losing player may have played only one hand and lost, the money they lost continues to churn through the poker economy. Prior to Applicants' inventive methodologies, the original source (the original player who had originally deposited the money with the gaming establishment) of such money lost by a player and which continues to be re-contributed to the revenues of the gaming establishment by virtue of being used as wager money by another player is not recognized and the originally depositing player is not rewarded for having originally contributed the money to the poker economy of the gaming establishment.

Applicant has recognized that there is a need for improved methods and algorithms for attributing revenue collected by a gaming establishment to the player(s) who originally contributed the revenue to the gaming establishment (e.g., the players who originally deposited the money with the gaming establishment). It would benefit gaming establishments to have reward or incentive programs which provide rewards or incentives to a given player based on an amount, rating, category or magnitude of the player's contribution to the casino's revenue, even if a player's contribution of a particular unit of revenue was not made in a current game event. Applicants' inventive embodiments allow this by associating or tagging each unit of currency (e.g., a virtual unit of currency, as it is represented and stored in a memory of a computing device) that is available for wagering to a given player with an identifier or indicator of the player who originally deposited that unit of currency with the gaming establishment. As described in more detail herein, a unit of currency may be a fractional amount and may be continually divided into smaller fractional amounts as needed or desired, while retaining its tag or indicator of the player who was the original depositor. Focusing on revenue from card games (e.g., poker card games) in particular, Applicants have recognized that conventional methods which reward players and business partners based on revenue attributable to them have failed to accurately and fairly attribute such revenue contributions at least because they have failed to account for an original source of the revenue (e.g., to a player who originally contributed a given unit of currency, or a fraction of a given unit of currency, to the poker economy of the gaming establishment).

In order to illustrate some differences between the inventive methodologies described herein and conventional methodologies, Applicant provides herein some examples of attributing or "crediting" to a player the player's contributions to the revenue of a gaming establishment. Such credited amounts may, for a given player, accumulate or be added to (as they are earned or determined for a player based on revenue collected by a gaming establishment) in an account or record associated with a player. In accordance with some embodiments, such an account may be used by a gaming establishment to value or rate a player and/or to determine what incentives or rewards the player qualifies for. Such an account or record may, in some embodiments, not be accessible or even known to the player for whom it is being tracked. Although the credited amounts are illustrated in terms of currency values (and particularly in dollars), the embodiments described herein are not dependent on any particular type of unit of value which may be used to track how much revenue a player, as an original source of the revenue, has contributed to a gaming establishment.

In the examples below and throughout the present disclosure, the following terms are used as defined below:

"Contributed Rake Revenue (weighted)" (CRR herein) refers to a conventional method in which every player who wagers on a hand (i.e., contributes to the pot) is credited with a percentage of the rake amount which is proportional to the amount they contributed to the pot.

"Winner's Rake Revenue (pot)" (WRR herein) refers to an alternate conventional method in which only the winner of the hand is credited with the entire rake amount.

"Original Depositor Revenue" (ODR herein) refers to the inventive method described herein with reference to various alternate embodiments, in which the original player who contributed a unit of monetary value to the revenue of the gaming establishment ("original depositor", "source player" or "originally depositing player" herein) is credited with the percentage of the rake for which s(he) was the original source, irrespective of whether the player is wagering on the current hand or at all active in the gaming establishment.

Applicant recognizes that it may desirable to implement one of several possible variants of the ODR method, which variants differ in how chips (whether virtual or physical) or other monetary units are ordered in a stack or collection of such chips or other monetary units associated with a player. In accordance with at least some embodiments, a player's "stack" or "wagering stack" is a representation of wagering value available to the player for wagering on a game event, represented in a particular order that a relevant program of a computing device is coded to access in a specified manner (e.g., the value in a wagering stack is accessed or utilized for wagering from "top" to "bottom" such that the value represented at the top of the stack is utilized first, with the program continuing to move down the stack as necessary in order to retrieve from the stack the full value of the player's wager). Below are some examples of variants of the ODR method which will be referred to herein:

(a) opponent's chips on top (OCOT), which is the variant used in the examples below, which "places", in the memory of the system, the money won from an opponent "on top" of a representation of money a player has to wager with (or otherwise places, tags, categorizes or indicates the money won from an opponent such that it will be used first in subsequent wagers made by the player, such that the money originally deposited by the player who is making the wagers is not used in making wagers unless and until the money won from opponents is used up);

(b) mixed chips from pot (MCFP), for which there may be several sub-variations. For example:

(i) the chips may be proportionally weighted, reflecting the total amount from each player (the proportionally weighted method in the hands of Example B below);

(ii) by betting order, following the sequence that the chips were put into the pot;

(iii) interleaved strata, creating multiple layers for each player;

(iv) randomly shuffled ranges, "stirring" the chips together randomly;

(c) player's chips (i.e., the chips representing money originally deposited with the gaming establishment by the player who is placing the wager) on top (PCOT)—similar in the long run, but the least accurate method;

(d) player's chips don't count (PCDC)—the player's own chips are always moved to the bottom of the stack, which may be applied to any of the above methods.

It should be noted that the term "chips" (as in "the player's chips" or "opponent's chips") is a term used for convenience only and is not intended to refer to any physical or actual casino chips (i.e., chips with predetermined values). Rather, the term "chip" as it is used herein is intended to refer to a virtual representation of value (which may be a whole unit or fraction of a unit) available to a player for wagering, just as the term "stack" is used to refer to a virtual representation of a plurality of units or portions of value that are configured in a particular order and utilized for a wager or other fee in a particular order (e.g., top to bottom).

One particular example of a sequence of game events that illustrates at least one embodiment of an ODR method is set forth in FIGS. 4A-4D and described with reference thereto. Other illustrative examples of variations of the ODR method are also provided below. However, prior to delving into these example game events and a description of how variants of the ODR method may be utilized to credit an original depositor of value with having introduced the value into the poker economy of a gaming establishment, descriptions of various systems and apparatus which may be utilized to implement one or more ODR methods and/or which may receive or track data useful in implementing one or more ODR methods (e.g., online gaming establishment systems via which online poker players participate in games or tournaments) are provided for context and understanding of the online gaming environment in which the ODR method(s) may be implemented.

Turning now to FIG. 1, illustrated therein is a block diagram of an example system 100 consistent with at least some embodiments. The system 100 may comprise a plurality of player devices 102a-102n in communication with a game server 110 via a network 104. For purposes of brevity, any or all of the player devices 102a-102n will be referred to as a player device 102 herein, even though the plurality of player devices 102a-102n may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device with which game server 110 is operable to communicate in order to at least access the data in database 140 (e.g., another server device remote from game server 140, operable to determine outcomes for an event instance of a game). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions.

Instructions may be embodied in, e.g., one or more computer programs and/or one or more scripts.

In some embodiments a game server 110 and/or one or more of the player devices 102 stores and/or has access to data useful for facilitating play of a game (e.g., a card game). For example, game server 110 and/or a player device 102 may store (i) one or more tables of units of value available for wagering by respective player (e.g., a different table for each player), with a source identifier associated with each unit of value or portion of a unit of value (which tables may further indicate an order in which the available units of value are to be wagered); (ii) an amount of credit or value attributed to a player based on a determination of how much revenue collected by the gaming establishment (e.g., on a rolling basis, within a predetermined period of time, etc.) is attributable to money originally deposited with the gaming establishment by the player; (iii) one or more probability databases for determining one or more outcome(s) (e.g., cards to be dealt to one or more players of a card game) for an event instance (e.g., hand or round) of a game; (iv) a current state or status of a game or game session (e.g., what cards are held by each of the participating players, the current bet amount for each player, an amount of rake collected by the gaming establishment based on an outcome of a current hand, etc.); (v) one or more user interfaces for use in a game; (vi) one or more game themes for a game; and/or (vii) profiles or other personal information associated with a player of a game (e.g., betting trends or betting profile of a player). It should be noted that in some embodiments such data may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

A game server 110 may comprise a computing device for facilitating play of a game (e.g., by receiving an input from a player (e.g., bet amount), determining an outcome or data for a game (e.g., cards dealt and/or winner of the hand), causing data of a game (e.g., cards dealt) to be displayed on a player device, facilitating a wager and/or a provision of a payout for a game). For example, the game server 110 may comprise a server computer operated by a game provider or another entity (e.g., a social network website not primarily directed at providing games). In some embodiments, the game server may determine data (e.g., cards to be dealt to one or more players) for a game by requesting and receiving such data from another remote server operable to provide such data. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator). Examples of processes that may be performed by the game server 110 (directly or indirectly) may include, but are not limited to: (i) determining a bet decision (e.g., bet amount) of a player; (ii) determining a source identifier for each portion of the bet amount; (iii) transmitting an indication of game elements determined for the game (e.g., cards to be dealt to players participating in the game); (iv) determining one or more winners of a hand of the game and/or the amounts won or lost by players participating in the hand based on cards dealt to the players and bets made by the players; (v) authorizing a game program to be downloaded to a player device; and/or (vi) determining an amount of the rake collected by the gaming establishment to credit to each player who is a source player for any portion of the bet amounts comprising the pot for the hand.

Turning now to a description of a player device 102, in accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ PlayStation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine or video poker type of machine) or a non-dedicated gaming device (e.g., a smart phone, tablet, laptop or desktop computer). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., cards dealt for a hand of the game, updating a betting progress indicator based on one or more bet decisions of players, credit balance of credits available for play of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). Although some embodiments described herein are described with respect to a fee collected by a gaming establishment such as an online wagering establishment or online casino, wherein the fee is a portion of wagers placed or an entry fee into a tournament or wagering event, it should be noted that the embodiments are also applicable to non-wagering gaming environments such as social games in which entry or membership-type of fees are collected rather than wagering-related fees.

In another embodiment, a player device 102 may store some or all of the program instructions for determining, for example, (i) that an event instance has been triggered or initiated (and, in some embodiments, communicating such a trigger or initiation to game server 110), such as determining that the dealing of a new hand has been requested by the players; (ii) outputting the one or more cards for the hand to the players, (iii) receiving bet decisions from players and outputting an indication of such bet decisions to the other players; and/or (iv) determining a winner of a hand. In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino (e.g., a gaming establishment comprising an online casino) accessed by one or more of the player devices 102.

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
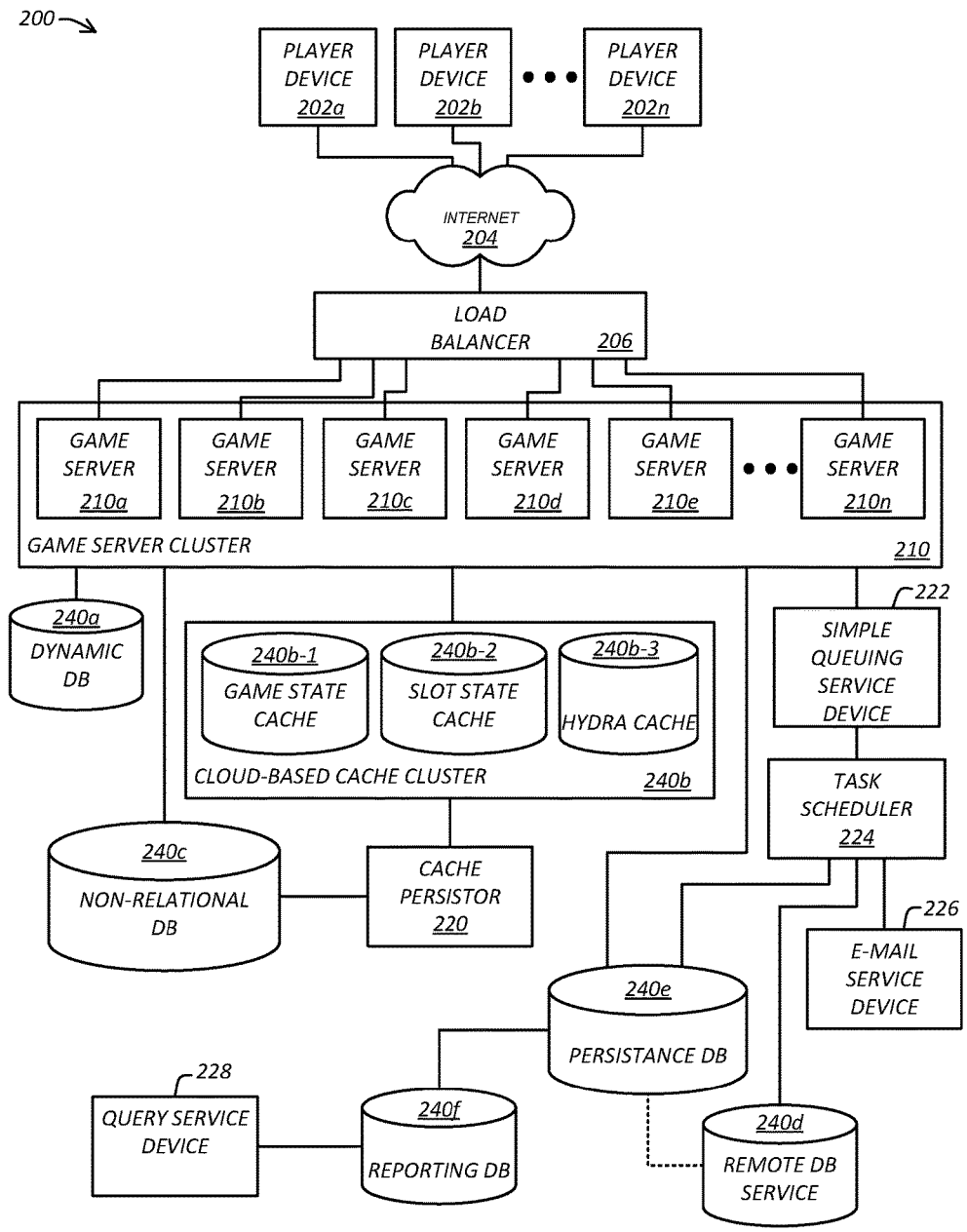
FIG. 2 is a schematic diagram of an embodiment of a social gaming platform in accordance with one or more embodiments described herein.

Referring now to FIG. 2, illustrated therein is a block diagram of a system 200 according to some embodiments. In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player device 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof (e.g., a Texas Hold'Em poker game). In some embodiments, the various game servers 210*a-n* (virtual and/or physical) of the game server cluster 210 may be configured to provide, manage, host, and/or conduct individual instances of available game types. A first game server 210*a*, for example, may host a first particular instance of an online poker game (or tournament), a second game server 210*c* may host a second particular instance of an online poker game (or tournament), a third game server 210*c* may facilitate an online poker tournament, and/or a fourth game server 210*d* may provide an online slots game.

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210a-b to experience detrimental issues), the load balancer 206 may call and/or bring online one or more of the other game servers 210c-n depicted in FIG. 2. In the case that each game server 210a-n comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202a-n and the game server cluster 210 are conducted and/or routed. Such proxy servers and/or devices may comprise one or more regional game hosting centers, for example, which may be geographically dispersed and addressable by player devices 202a-n in a given geographic proximity. In some embodiments, the proxy servers and/or devices may be located in one or more geographic areas and/or jurisdictions while the game server cluster 210 (and/or certain game servers 210a-n and/or groups of game servers 210a-n thereof) is located in a separate and/or remote geographic area and/or jurisdiction.

According to some embodiments, for specific game types, if any, the game server cluster 210 may provide game outcomes to a controller device (not separately shown in FIG. 2) that times the release of game outcome information to the player devices 202a-n such as by utilizing a broadcaster device (also not separately shown in FIG. 2) that transmits the time-released game outcomes to the player devices 202a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210a-n thereof) may be in communication with the dynamic DB 240a. According to some embodiments, the dynamic DB 240a may comprise a dynamically-scalable database service such as the DyanmoDB™ service provided by Amazon® Web Services, LLC. The dynamic DB 240a may, for example, store information specific to one or more certain game types (e.g., a multi-player poker game) provided by the game server cluster 210 such as to allow, permit, and/or facilitate reporting and/or analysis of such information.

According to some embodiments, the game server cluster 210 (and/or one or more of the game servers 210a-n thereof) may be in communication with the cloud-based cache cluster 240b. Game state information from the game server cluster 210 may be stored in the game state cache 240b-1, for example, card game state (e.g., card-game specific state) data may be stored in the game state cache 240b-2, and/or other game and/or player information (e.g., progressive data, player rankings, audit data) may be stored in the hydra cache 240b-3. In some embodiments, the cache persistor 220 may move and/or copy data stored in the cloud-based cache cluster 240b to the non-relational DB 240c. The non-relational DB 240c may, for example, comprise a SimpleDB™ service provided by Amazon® Wed Services, LLC. According to some embodiments, the game server cluster 210 may generally access the cloud-based cache cluster 240b as-needed to store and/or retrieve game-related information. The data stored in the cloud-based cache cluster 240b may generally comprise a subset of the newest or freshest data, while the cache persistor 220 may archive and/or store or move such data to the non-relational DB 240c as it ages and/or becomes less relevant (e.g., once a player logs-off, once a game session and/or tournament ends). The game server cluster 210 may, in accordance with some embodiments, have access to the non-relational DB 240c as-needed and/or desired. The game servers 210a-n may, for example, be initialized with data from the non-relational DB 240c and/or may store and/or retrieve low frequency and/or low priority data via the non-relational DB 240c.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide game and/or tournament information to the server cluster 210. According to some embodiments, the task scheduler 224 may initiate communications with the SQS device 222, the e-mail service provider 226 (e.g., providing e-mail lists), the remote DB service 240d (e.g., providing inserts and/or updates), and/or the persistence DB 240e (e.g., providing and/or updating game, player, and/or other reporting data), e.g., in accordance with one or more schedules.

According to some embodiments, the persistence DB 240e may comprise a data store of live environment game and/or player data. The game server cluster 210 and/or the task scheduler 224 or SQS device 222 may, for example, store game and/or player data to the persistence DB 240e and/or may pull and/or retrieve data from the persistence DB 240e, as-needed and/or desired. The server cluster 210 may, according to some embodiments, provide and/or retrieve bet cycle and/or other game event information and/or configuration information via the persistence DB 240e.

In some embodiments, the reporting DB 240f may be created and/or populated based on the persistence DB 240e. On a scheduled and/or other basis, for example, a data transformation and/or mapping program may be utilized to pull data from the live environment (e.g., the persistence DB 240e) into the reporting DB 240f. The query service 228 may then be utilized, for example, to query the reporting DB 240f, without taxing the live environment and/or production system directly accessible by the game server cluster 210.

Figure 3:
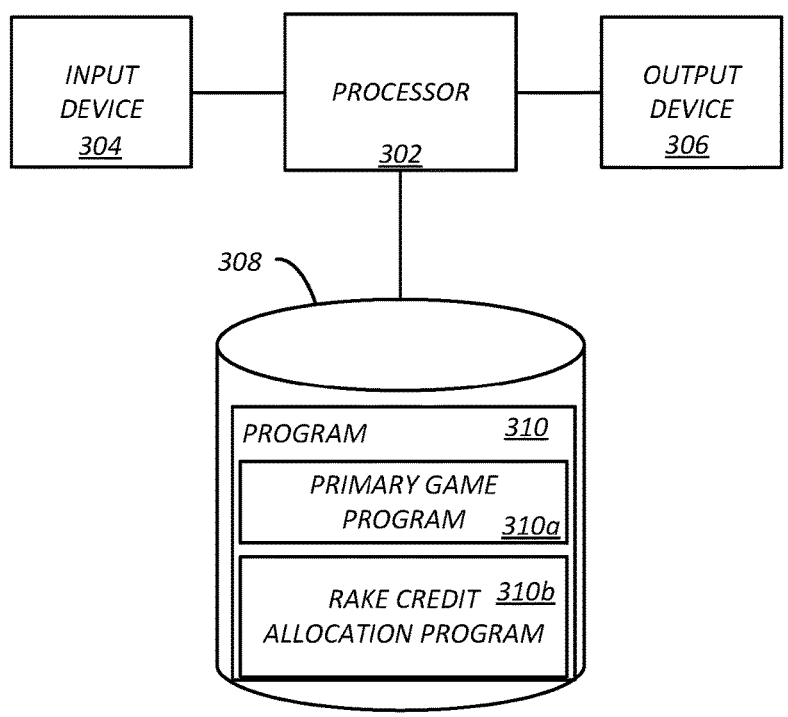
FIG. 3 is a schematic diagram of a gaming system in accordance with one or more embodiments described herein.

Referring now to FIG. 3 is a block diagram of an apparatus 300 according to some embodiments. In some embodiments, the apparatus 300 may be similar in configuration and/or functionality to any of the player devices 102, the game server 110 and/or another server device operable to facilitate the embodiments described herein. The apparatus 300 may, for example, execute, process, facilitate, and/or otherwise be associated with any of the processes described herein.

In some embodiments, the apparatus 300 may comprise a processor 302, an input device 304, an output device 306 and/or a memory device 308. Fewer or more components and/or various configurations of the components 302, 304, 306 and/or 308 may be included in the apparatus 300 without deviating from the scope of embodiments described herein.

According to some embodiments, the processor 302 may be or include any type, quantity, and/or configuration of processor that is or becomes known. The processor 302 may comprise, for example, an Intel® IXP 2800 network processor or an Intel® XEON™ Processor coupled with an Intel® E7501 chipset. In some embodiments, the processor 302 may comprise multiple inter-connected processors, microprocessors, and/or micro-engines. According to some embodiments, the processor 302 (and/or the apparatus 300 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 302 comprises a server such as a blade server, necessary power may be supplied via a standard AC outlet, power strip, surge protector, and/or Uninterruptible Power Supply (UPS) device.

In some embodiments, the input device 304 and/or the output device 306 are communicatively coupled to the processor 302 (e.g., via wired and/or wireless connections and/or pathways) and they may generally comprise any types or configurations of input and output components and/or devices that are or become known, respectively.

The input device 304 may comprise, for example, a keyboard that allows an operator of the apparatus 300 to interface with the apparatus 200 (e.g., by a player, an employee or other worker affiliated with either an online casino or other entity operating a system which provides games to players). In some embodiments, the input device 304 may comprise a mechanism configured to indicate to a remote server device an initiation of an event and/or a bet decision of a player during a game (e.g., that a player has joined a game, requested that cards be dealt for a hand of a card game or indicated that he/she would like to Raise a current bet amount during a bet cycle), such information being provided to the apparatus 300 and/or the processor 302. In such embodiments, the input device may comprise a key on a keyboard of the apparatus 300. Other examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a touch-screen, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 306 may, according to some embodiments, comprise a display screen and/or other practicable output component and/or device that is operable to output information. The output device 306 may, for example, comprise a display screen via which are output instructions, guidance, questions or information to a player of an online game. For example, the output device may output a game interface for outputting information regarding a current ongoing hand of a card game, such as the status of players participating in the hand, their current bet amounts and an outcome of the hand. Some additional examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 304 and/or the output device 306 may comprise and/or be embodied in a single device such as a touch-screen monitor.

In some embodiments, the apparatus 300 may comprise any type or configuration of communication device (not shown) that is or becomes known or practicable. For example, the apparatus 300 may include a communication device such as a NIC, a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., a bet decision of a player participating in a multi-player online card game) to a server (e.g., game server 110) in communication with a plurality of player devices 102. According to some embodiments, the communication device may also or alternatively be coupled to the processor 302. In some embodiments, the communication device may comprise an IR, RF, Bluetooth™, and/or Wi-Fi® network device coupled to facilitate communications between the processor 202 and another device.

The memory device 308 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 308 may, according to some embodiments, store a program 310 for facilitating one or more of the embodiments described herein, which program may include a primary game program 310*a* for facilitating play of a multi-player online card game and a rake credit allocation program 310*b* for determining, based on a wager placed by a player and the various source identifiers (identifying original depositor players who may be associated with one or more portions of the wager), which players should be credited for a portion of the rake collected by the gaming establishment and the amounts to be credited to each player. In some embodiments, the primary game program 310*a* and/or the rake credit allocation program 310*b* may be utilized by the processor 302 to provide output information via the output device 306. It should be noted that in some embodiments the fee that is apportioned among players based on who is an original source or depositor of portions of the fee may be performed for other types of fees, not just a rake amount. For example, a similar process may be implemented to apportion credit to original depositors who contributed to a fee comprising a single wager, an entry fee (e.g., an entry fee into a game or tournament) or membership fee for joining a game or gaming club. Accordingly, it should be understood that the name "rake credit allocation program" is used for convenience only and should not be interpreted in a limiting manner to limit the types of fees that may be allocated among original depositors who contributed value that is currently included in the fee.

The primary game program 310*a* may, for example, comprise instructions for (i) determining cards to be dealt to players participating in an online poker game or other card game, (ii) recognizing a bet decision of a player and outputting it to the other players of the game; and/or (iii) determining a winner of a hand of the online poker game or other card game. The rake credit allocation program 310*b* may, for example, comprise instructions for (i) determining, for each player participating in a hand (each such player referred to as a participating player herein), the wager amount for that player and what percentage of the total pot amount the wager comprises; (ii) determining a rake amount collected for the hand; (iii) determining, based on the percentage of the total pot amount that a given player's wager comprises and for each participating player; what portion of a rake amount collected is attributable to which participating player; (iv) determining, for each participating player's wagers, the at least one player who is an originally depositing player of the money comprising the wager (such players being referred to as source players herein); (iv) determining, for each participating player of the hand, the percentage of the player's wager amount which is attributable to each source player corresponding to the wager amount; (v) determining, for each participating player's wager and based proportionally on the portions of the wager attributable to the different source players, what percentage of the rake amount attributable to the participating player's rake allocation should be credited to which source player. As described herein, the determination of which source players correspond to portions of a participating player's wager (and what percentage or portion of the participating player's wager is attributable to which source player) may be determined differently based on which variant of the ODR algorithm is being implemented. As described below in the context of Example A (described with reference to FIGS. 4A-4D) and Example B, the money available to a given participating player for wagering may have different source players associated therewith based on (i) which other players the participating player previously won money from in previous hands; (ii) which other player was the original depositor (the player who originally deposited the money with the gaming establishment) of any portion of the money available to the participating player for wagering; and/or (iii) the order in which the different amounts of money associated with different source players is placed in the player's "stack".

Turning now to FIGS. 4A-4D, illustrated therein are representations of data (e.g., data as it may be stored in a memory of a computing device, such as a game server device that facilitates the tracking of wagers and/or a rake (or other fee) allocation program) as it may be generated, retrieved or otherwise determined during a plurality of game events. The plurality of game events referenced in FIGS. 4A-4D comprise a plurality of hands of a poker game, each hand involving two (2) specified players. Of course any number of players may participate in a hand or game event conducted in accordance with embodiments described herein, two is a number used for purposes of simplicity in order to clearly describe one embodiment of the present invention. It should be noted that the records or tables via which data is represented in FIGS. 4A-4D are not intended to be limiting. Any format or expression of such data may be utilized, it is the substance of the data and determinations that is the focus of the present description rather than the particular visual representation of the data (unless specified otherwise in the description). The symbol "∞" when used in the tables or description herein means "infinite", or "arbitrarily large" to indicate any remainder of a particular wagering stack in which it is used. The game events and data illustrated in FIGS. 4A-4D are referred to as "Example A" herein.

In Example A, a plurality of hands in a poker game are tracked to illustrate how revenue contributions of four different players (P1, P2, P3 and P4) are credited to the players over a course of the hands in a poker game (in which example only two of the four players participate in any given hand). Example A compares, for each of the plurality of hands, how the different players may be credited under three different methods: WRR, CRR, and ODR (using OCOT). It may be assumed, for purposes of Example A, that the gaming establishment collects a rake of 5% of the pot, up to a maximum of $3.00. Example A is presented using dollar amounts as the monetary units being wagered and used to determine an amount to be credited to a particular player based on an amount collected as a rake for a given hand. Of course, other monetary units may be utilized and the embodiments described herein are not dependent on any particular currency or monetary unit.

Figure 4A:
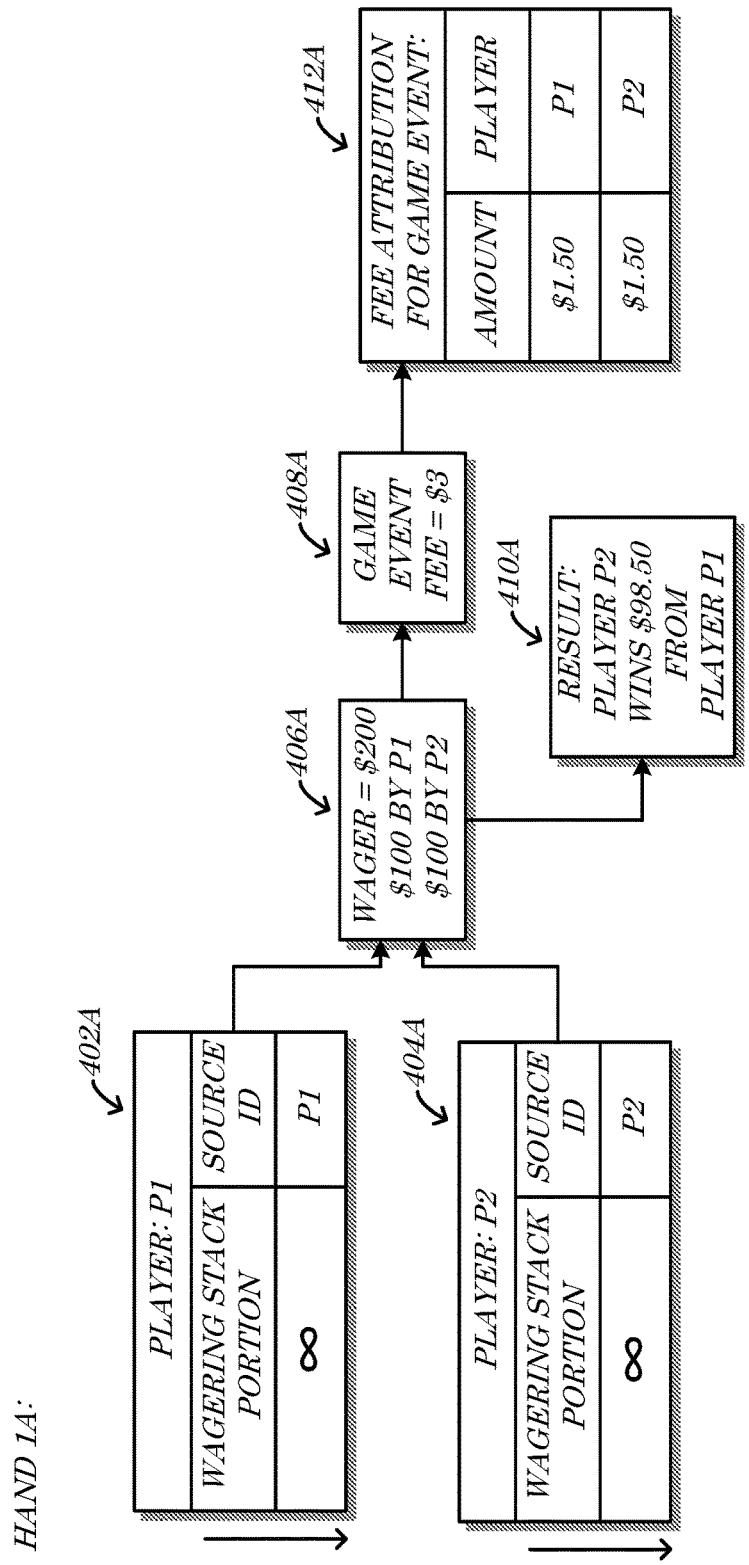
FIGS. 4A-4D comprise records utilized to track monetary events in a plurality of hands of a poker game, in accordance with some embodiments.

Turning now to FIG. 4A in particular, illustrated therein is data for a poker hand referred to as "Hand 1A." Participating in Hand 1A is Player P1 and Player P2, betting $100 each (i.e., $200.00 total pot amount). Data 402A illustrates the wagering stack of Player P1, which comprises the amount of value Player 1A has available for wagering on the present hand. In particular, data 402A indicates the different portions (if there is more than one portion) associated with different original depositor players (as indicated by unique source identifiers corresponding to the portion of the wagering stack which can be traced back as having originally been deposited with the wagering establishment by the player identified by the unique source identifier). For purposes of the present example, it may be assumed that all of the value in player P1's wagering stack was originally deposited by player P1 (i.e., player P1 is not, at the time of the game event being depicted in FIG. 4A, wagering with any money he/she won from another player as best as this can be determined by the system of the wagering establishment). This information is represented in data 402A, since the entirety of player P1's wagering stack is attributable to player P1 as the source or original depositor. Similarly, for purposes of the present example and as indicated in data 404A, it may be assumed that the entirety of player P2's stack is attributable to player P2 (i.e., player P2 is playing only with his own money at this time, not with any money he won from another player, as best as the wagering system can determine this information).

Further, as indicated by the downward arrows shown to the right of both data 402A and 404A, any value taken from either player's wagering stack will be used top-to-bottom (although for purposes of the present hand this information is not very useful, as all of the money in each wagering stack is attributable to only one respective source, the player who is making the wager from that wagering stack). Of course, other schemes of an order or mechanism via which value from a player's wagering stack may be removed and utilized for a wager placed by the player may be utilized in other embodiments.

Turning now to data 406A, it is indicated therein that each player has wagered $100 on Hand 1A, for a total pot of $200. Data 408A indicates that the fee collected by the wagering establishment for this pot is $3 (5% of the pot, up to a $3/hand cap). As indicated in data 410A, the result of Hand 1A (e.g., after a final hand composition for each player is determined and a winner of the hand is determined based on the rules of the game) is that player P2 wins $98.50 from player P1. In accordance with some embodiments, the amount of the rake fee is collected from the wagers comprising the pot in proportion to each player's contribution to the total pot amount. Thus, for Hand 1A, $1.50 is deducted from each player's $100 wager. In accordance with some embodiments, player P2 obtains $98.50 of his original wager amount back (i.e., $98.50 of player P1's wager is returned to player P1's wagering stack, which is his $100 wager less the $1.50 rake fee that was determined based on the player's contribution to the total pot amount). Additionally, $98.50 of player P1's wager is also added to player P2's wagering stack. In accordance with one embodiment (the OCOT ("Opponent's Chips On Top") variant of the inventive ODR method), any value won from an opponent is placed or represented on top of any value attributable to the player whose wagering stack it is. Thus, upon the resolution of Hand 1A, player P2's wagering stack may be represented as illustrated in data 402B (FIG. 4B), wherein the first $98.50 in value (a first portion) of player P2's wagering stack may correspond to source identifier P1 (since this money was won from player P1 in Hand 1A, player P1 being the original depositor of this money with the gaming establishment) and the remainder of the wagering stack is attributable to player P2 as the source.

As indicated in data 412A, based on the fact that in this example each player P1 and P2 was the respective and only source for the wager amount they placed, players may be credited based on the rake amount collected for Hand 1A as follows (the ODR (OCOT variant) as illustrated in data 412A and the conventional methods WRR and CRR being illustrated for comparison purposes):

TABLE 1A

| Revenue Crediting Method | Player-Amount Credited | Player-Amount Credited |
|---|---|---|
| WRR | P1-Ø | P2-$3.00 |
| CRR | P1-$1.50 | P2-$1.50 |
| ODR (OCOT) | P1-$1.50 | P2-$1.50 |

In accordance with one embodiment, the following respective example formulas may be utilized for calculating the Amount Credited for each player using the various methods (WRR, CRR and ODR) described herein:

WRR: $R\_i = R$ if i won the hand, zero (0) otherwise.
CRR: $R\_i = R * W\_i / P$,
  where $W\_i$ is the amount of chips in the pot that were wagered by i.
ODR: $R\_i = R * D\_i / P$,
  where $D\_i$ is the amount of chips in the pot that were originally deposited by i.
For each of the above formulas:
  let R be the total rake collected in the hand,
  let $R\_i$ be the rake credited to player i, and
  let P be the total pot amount.

For purposes of simplicity, the case of multiple winners of the pot is ignored, as such a case does not present a need to take this factor into account in the above formulas because it is assumed the winners share the pot equally in the examples presented herein. In other embodiments in which winners do not share the pot equally, the above formulas may need to be modified to take this variable into account.

It should be noted that $R\_i$ is automatically zero (0) with the WRR and CRR methods if i is not in the hand, but not necessarily with the ODR method.

In accordance with some embodiments, the ODR formula above may be applied to all ODR variants, for embodiments in which the ODR methods are equivalent with regard to how the rake is collected.

It should further be noted that although short player identifiers such as "P1" and "P2" are used herein for purposes of clarity, any useful player identifier for uniquely identifying a player to a gaming establishment may be implemented. For example, many gaming establishments assign a unique player identifier to each player (which player identifier may be used for various purposes, in different databases or tables and include various useful information therein) and such a player identifier may be utilized in any of the embodiments described herein in place of the short "P1", "P2", "P3" and "P4" identifiers utilized herein.

As can be appreciated from studying the data in Table 1A above, for the Hand 1A there is no difference in the amounts the two players P1 and P2 are credited or the amounts credited to those players between the CRR method and the inventive ODR (OCOT) method. This is because, while the inventive ODR (OCOT) method takes into account the original depositor or source player for monetary units which are being wagered, in Hand 1A the original depositors or source players for the respective wagered amounts are the players who are placing the wagers. But it should be noted that while player P1 might leave the site after a single hand, or at least not participate in Hand 2A (which is described below), player P1 is accurately and fairly credited using the ODR (OCOT) method when player P2 wagers in Hand 2A using the value he won from player P1 in Hand 1A. The data for the ODR (OCOT) method, which credits a player for the % of the total pot amount which came from money for which the player was an original depositor, illustrates that (i) player P1 is credited with 50% of the $3.00 rake amount ($1.50), since 50% of the pot amount for Hand 1 was made with money for which player P1 was the original depositor; and (ii) player P2 is also credited with 50% of the $3.00 rake amount ($1.50), since 50% of the pot amount for Hand 1A was made with money for which player P2 was the original depositor.

At the resolution of this Hand 1A, once the $3.00 rake is collected and the $197 is provided to player P2, player P2's "stack" of available money for wagering reflects that of the $197: (i) $98.50 is player P2's own money which was wagered and returned to him (such that this $98.50 will be tagged or identified in a memory as money for which player P2 is the original depositor and which will not be put at the top of player P2's "stack" of money available for wagering in accordance with the OCOT variant of the ODR method); and (ii) $98.50 is money wagered and lost by player P1 and for which player P1 is the original depositor, such that this $98.50 will be tagged or identified in memory as money for which player P1 is the original depositor). The money available for wagering to player P2 after the resolution of Hand 1A is illustrated in data 402B in FIG. 4B, which illustrated player P2's wagering stack (and the source or original depositor corresponding to the various wagering stack portions that are attributable to different sources. In accordance with some embodiments, a player identifier associated with a particular amount or portion of money available to a player for wagering (even if that player identifier is not the player identifier of the player to whom the money is available for wagering, such as the "P1" identifier which identifies the original depositor of the first $98.50 of the money available for wagering to player P2 in Table 1A-P above) may be referred to as a "source identifier" herein.

Figure 4B:
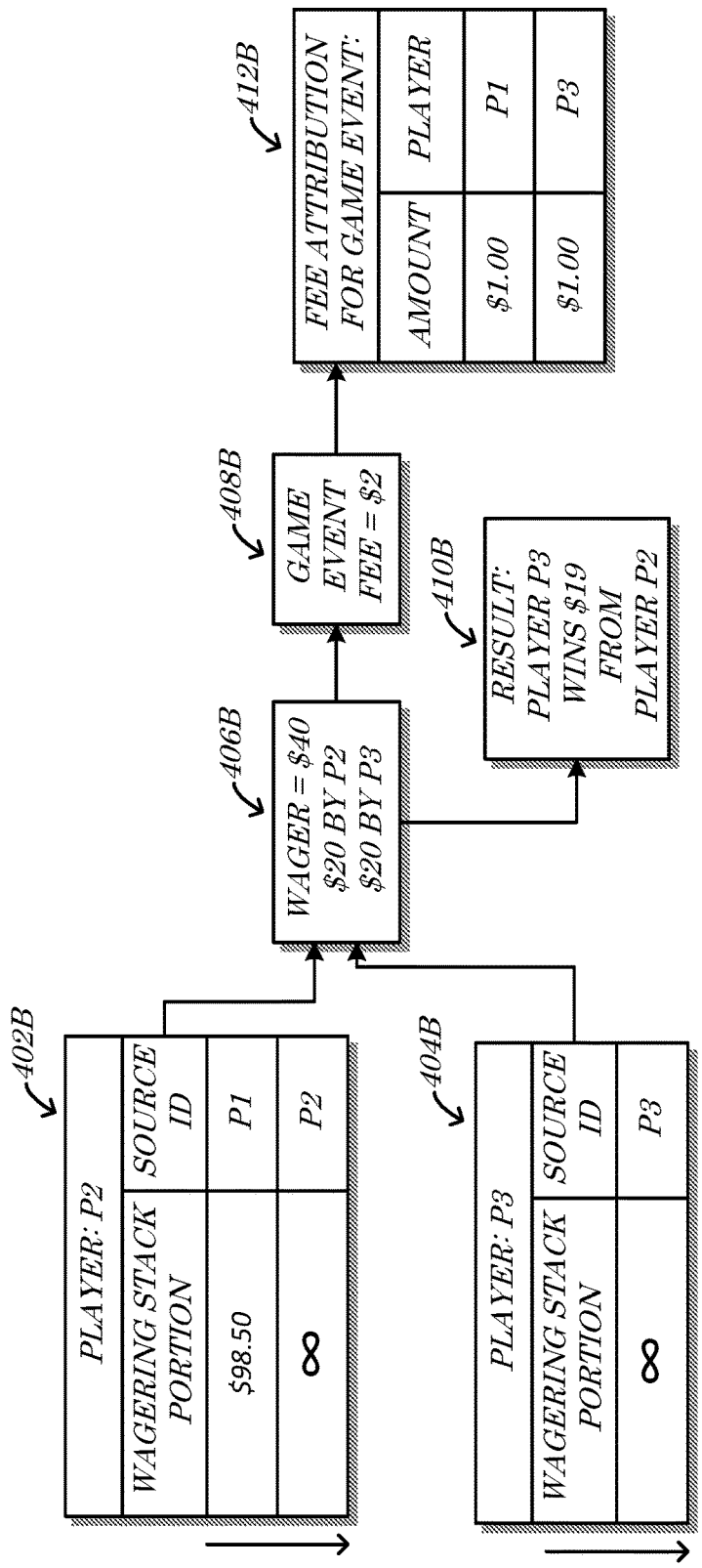

Continuing with Example A and turning now to FIG. 4B, it may be assumed for purposes of Example A that the very next game event that player P2 participates in after participating in Hand 1A is Hand 2A. Player 2A, who won against player P1 in Hand 1A, subsequently places a wager in a different hand. Participating in Hand 2A is player P2 and player P3. Data 402B illustrates the composition of the wagering stack for player P2 and data 404B illustrates the makeup of the wagering stack of player P3. The composition of player P3's wagering stack is illustrated in data 404B, which indicates that player P3 is the original depositor of all the value currently in his wagering stack (since player P3 is the only source identifier for the entirety of the value of the wagering stack). The downward arrow to the right of each of the wagering stacks indicated in data 402B and 404B indicates that any wagers made from these respective wagering stacks will be obtained first from the top-most portion (and corresponding source identifier), then moving downwards as needed until the full wager amount is achieved.

As indicated in data 406B, player P2 and player P3 each wager $20 on the game event of Hand 2A, for a total pot amount of $40.00. As indicated in data 408B, the gaming establishment collects a fee of $2 (5% of total pot amount) for this pot ($1 coming from the wager of player P2 and $1 coming from the wager of player P1, in accordance with some embodiments). Since the OCOT variant of the ODR method is being used, it may be assumed for purposes of the ODR method that all $20 bet by player P2 is from the money player P2 won from player P1 in Hand 1 (since the first $98.50 of the wagering stack for player P2 corresponds to source identifier P1, which identifies player P1 as the original depositor of this $98.50). It may further be assumed that player P3's bet is from his own originally deposited money (i.e., not money player P3 has previously won from other players).

Figure 4C:
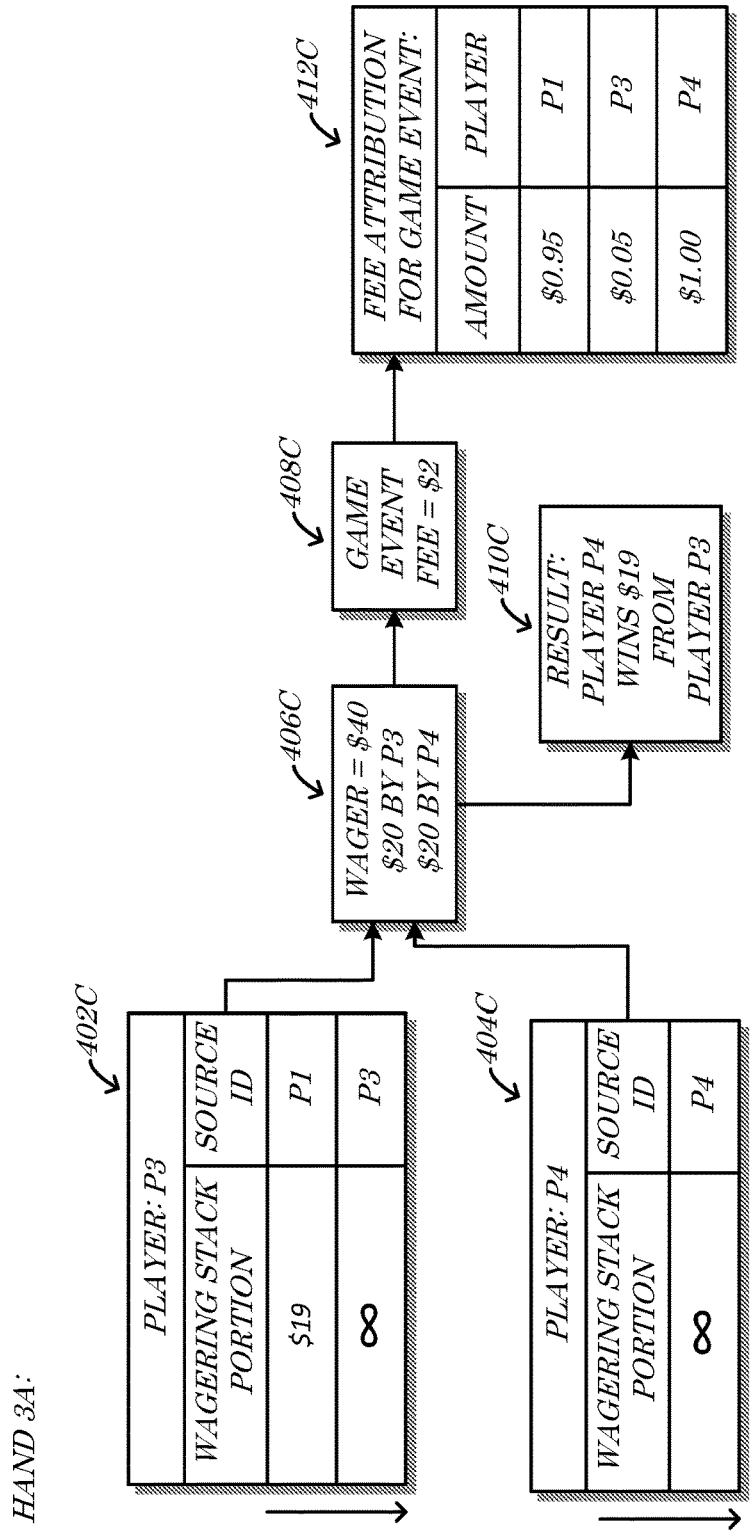

Data 410B indicates that a result of Hand 2A is that player P3 wins the hand, winning $19 from player P2. Thus, $19 of player P3's wager (less the $1 collected by the wagering establishment as part of the rake fee) is returned to player P3's wagering stack and $19 of player P2's wager (which, as described above, is actually money for which player P1 is the original depositor and which is therefor associated with source identifier P1). Thus, after resolution of Hand 2A, the composition of player P3's wagering stack is as illustrated in data 402C (FIG. 4C).

Returning to FIG. 4B, using the source identifier information from each of data 402B and data 404B to determine where the money being wagered in Hand 2A (and thus collected as the rake fee indicated in data 408B) originated from, players may be credited based on the rake amount collected for Hand 2A as indicated in data 412B: player P1 is credited with $1 of the rake fee (since the $1 of the rake fee collected from Player P2's wager corresponds to source identifier P1) and player P3 is also credited with $1 of the rake fee.

Table 2A below offers a comparison of how players may be credited for the $2 rake fee collected as a result of Hand 2A when utilizing the inventive method ODR (OCOT variant) vs. the conventional methods WRR and CRR, respectively.

TABLE 2A

| Revenue Crediting Method | Player-Amount Credited | Player-Amount Credited |
| --- | --- | --- |
| WRR | P2-Ø | P3-$2.00 |
| CRR | P2-$1.00 | P3-$1.00 |
| ODR (OCOT) | P1-$1.00 | P3-$1.00 |

As illustrated in the example data of Table 2A and in data 412B of FIG. 4B, using the inventive ODR method player P1 is credited for a portion of the rake collected by the gaming establishment for Hand 2A even though player P1 did not place a wager in Hand 2A. This is because the ODR method, unlike conventional methods, credits the player who originally deposited the money being wagered with rather than the player who is currently wagering the money (in the present example the money player P2 is wagering with comprises the money he previously won from player P1 in Hand 1A and thus player P1 is the original depositor of the money being wagered in Hand 2A by player P2). It should be noted that it may not be unusual in using the ODR method for a consistently winning player to rarely be credited for a portion of the rake attributable to his wager, since the consistently winning player is likely to almost always be playing with money he previously won from another player. The data for the ODR (OCOT) method, which credits a player for the % of the total pot amount which came from money for which the player was an original depositor, illustrates that (i) player P1 is credited with 50% of the $2.00 rake amount ($1.00), since 50% of the pot amount for Hand 2A was made with money for which player P1 was the original depositor (even though this money was actually wagered by player P2, who previously won that money from player P1) and (ii) player P3 is also credited with 50% of the $2.00 rake amount ($1.00), since 50% of the pot amount for Hand 2A was made with money for which player P3 was the original depositor (player P3 is wagering with money he originally deposited, not money he won from some other player).

Upon the resolution of this Hand 2A (and as reflected in the wagering stack represented by data 402C of FIG. 4C), once the $2.00 rake is collected and the $38 is provided to player P3, player P3's wagering stack of money available for wagering reflects the original sources of the $38 that is added to the wagering stack: (i) $19 is his own money which was wagered and returned to him (such that this $19 will be tagged or identified as money for which player P3 is the original depositor and which will not be put at the top of player P3's "stack" of money available for wagering in accordance with the OCOT variant of the ODR method); and (ii) $19 is money wagered by player P2 but for which player P1 is actually the original depositor since player P2 won this money from player P1 in Hand 1A, such that this $19 will be tagged or identified as money for which player P1 is the original depositor).

Continuing with Example A, it may be assumed that the very next game event in which player P3 wagers after winning Hand 2A is Hand 3A, for which hand data is generated and illustrated in FIG. 4C. In Hand 3A player P3 is wagering at least partially with money originally deposited with the gaming establishment by player P1, which player P2 won from player P1 in Hand 1A and which player P3 then won from player P2 in Hand 2A. Data 402C reflects the source identifiers of the various portions of the wagering stack for player P3.

The composition of player P4's wagering stack is illustrated in data 404C, which indicates that player P4 is the original depositor of all the value currently in his wagering stack (since player P4 is the only source identifier for the entirety of the value of the wagering stack). The downward arrow to the right of each of the wagering stacks indicated in data 402C and 404C indicates that any wagers made from these respective wagering stacks will be obtained first from the top-most portion (and corresponding source identifier), then moving downwards as needed until the full wager amount is achieved.

As indicated in data 406C, player P3 and player P4 each wager $20 on the game event of Hand 3A, for a total pot amount of $40.00. As indicated in data 408C, the gaming establishment collects a fee of $2 (5% of total pot amount) for this pot (50% of this fee coming from the wager of player P3 and 50% of this fee coming from the wager of player P4, in proportion to the amount of the pot that each player contributed and in accordance with some embodiments).

Data 412C indicates how players are credited for the rake fee of $2 collected by the gaming establishment as a result of Hand 3A. As indicated in data 412C, player P1 is credited for $0.95 of the rake fee, player P3 is credited for $0.05 of the rake fee and player P4 is credited for $1.00 of the rake fee. These amounts are, in accordance with some embodiments, calculated using the source identifier information from each of data 402C and data 404C to determine where the money being wagered in Hand 3A (and thus collected as the rake fee indicated in data 408C) originated from. Since the OCOT variant of the ODR method is being used, it may be assumed for purposes of the ODR method that all $19 of the $20 wager made by player P3 is from the money player P3 won from player P2 in Hand 2A, which corresponds to source identifier P1, and $1 of the $20 wager made by player P3 is from player P3's originally deposited money (since only the first $19 of the wagering stack for player P3 corresponds to source identifier P1, which identifies player P1 as the original depositor of this $19, and the remainder of the wagering stack corresponds to player P3). It may further be assumed that player P4's entire bet is from his own originally deposited money (i.e., not money player P4 has previously won from other players). Thus, 50% of the total pot amount came from money originally deposited by player P4 and player P4 will be credited with 50% of the rake amount. Since $19 (the amount of the pot amount that corresponds to source identifier P1, from the wager of player P3) is 47.5% of $40.00 (the total pot amount for Hand 3A) and $1.00 (the remainder of the wager made by player P3, which corresponds to source identifier P3) is 2.5% of $40.00, 47.5% of the total pot amount in Hand 3A came from money originally deposited with the gaming establishment by player P1 and 2.5% of the total pot amount in Hand 3A came from money originally deposited with the gaming establishment by player P3. Thus, under the ODR (OCOT) method player P1 will be credited for 47.5% of the rake amount collected (i.e., $0.95), player P3 will be credited with 2.75% of the rake amount collected (i.e., $0.05) and player P4 will be credited with 50% of the rake amount collected (i.e., $1.00).

Data 410C indicates that a result of Hand 3A is that player P4 wins the hand, winning $19 from player P3. Thus, $19 of player P4's wager (less the $1 collected by the wagering establishment as part of the rake fee) is returned to player P4's wagering stack. An additional $19 is added to player P4's stack, which is $19 of player P3's wager. However, since the wager of player P3 had more than one source identifier associated therewith (both P1 and P3), the $19 won from player P3 does not all correspond to player P3 as a source identifier. Specifically (and as illustrated in data 402D of FIG. 4D, which indicates the composition of player P4s wagering stack upon the resolution of Hand 3A), $18.05 of player P4's wagering stack is money wagered by player P3 in Hand 3A but for which player P1 is actually the original depositor since player P3 won this money from player P2 in Hand 2A, who in turn had won the money from player P1 in Hand 1A, such that this $18.05 will be tagged or identified as money for which player P1 as the original depositor; and (iii) $0.95 is money wagered by player P3 for which player P3 is the original depositor, such that $0.95 will be tagged or identified as money for which player P3 as the original depositor.

Figure 4D:
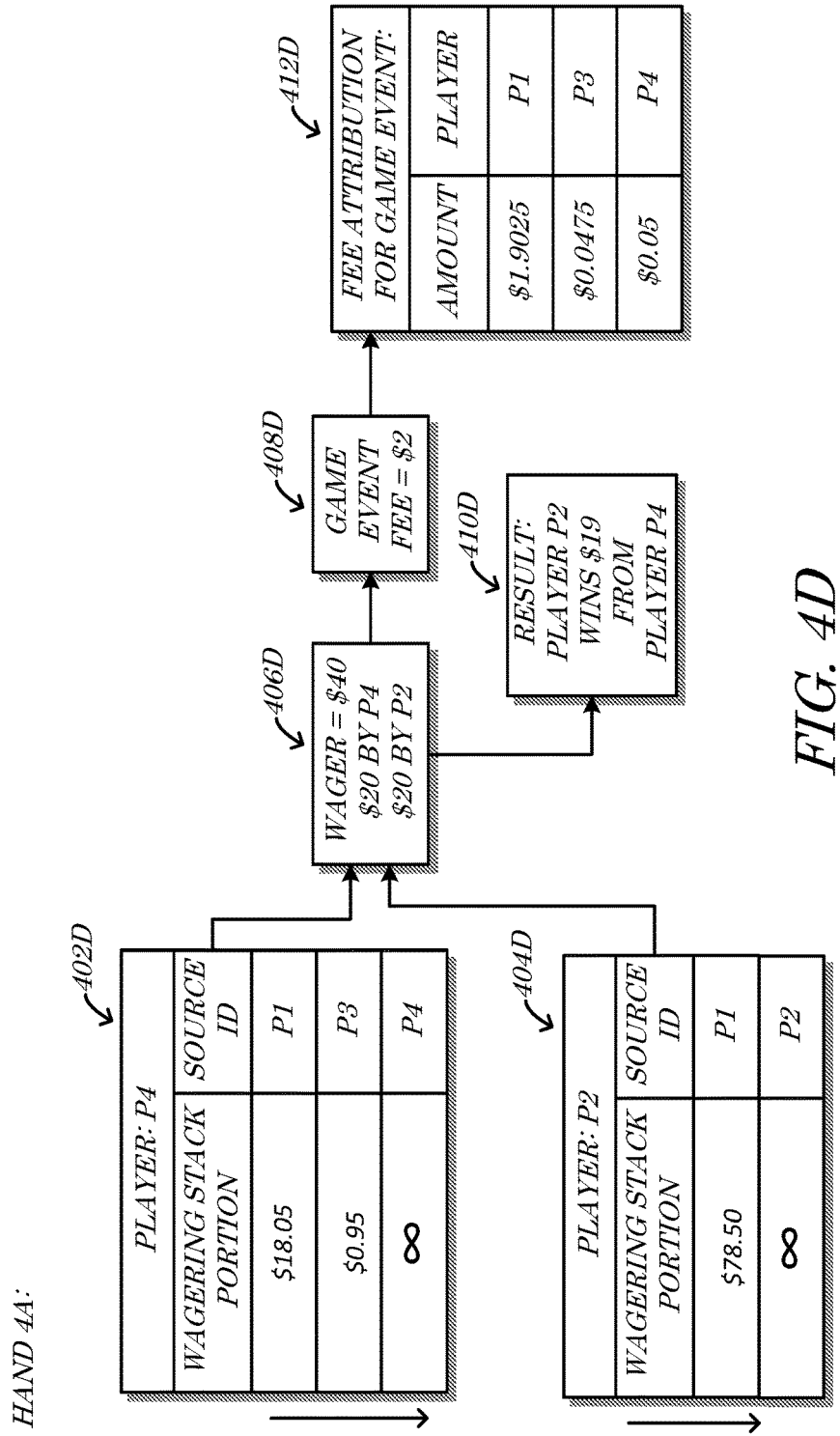

The derivation of the $18.05 and $0.95 amounts may bear some explanation. In accordance with some embodiments, the % of the rake amount deducted from a wager (prior to winnings being paid out) is proportionally to the % of the pot that the wager constitutes. Thus, in Hand 3A, player P3 wagered 50% of the total pot amount so 50% of the rake amount (i.e., $1.00) was deducted from player P3's wager prior to the winnings for the hand being paid to player P4. Thus, $19 of player P3's wager was paid out to player P4. However, player P3 had not wagered only with money for which he was the original depositor. Of the $20 wagered by player P3, $19 (i.e., 95% of the $20 wager) was money for which player P1 was the original depositor and $1 (i.e., 5% of the $20 wager) was money for which player P3 was the original depositor. In accordance with some embodiments, the rake amount deducted from a particular player's wager is deducted proportionally from the money amounts attributable to different original depositors which made up that wager. Thus, the $1 which is deducted from the $20 wager of player P3 may, in accordance with some embodiments, be broken out as follows: $0.05 of the $1.00 (5%) is deducted from the portion of the wager for which player P3 is the original depositor and $0.95 (95%) is deducted from the portion of the wager for which player P1 is the original depositor. Further in accordance with some embodiments, the remaining part of the losing player's wager which is provided to the winning player is attributed based on these same percentage amounts. Thus, of the $19 of player P3's wager which is provided to player P4, $18.05 (95%) is attributable to player P1 as the original depositor and $0.95 (5%) is attributable to player P3 as the original depositor. Thus, upon resolution of Hand 3A, the composition of player P4's wagering stack is as illustrated in data 402D (FIG. 4D).

Returning to a description of how the $2.00 rake fee for Hand 3A is credited to players, Table 3A below offers a comparison of how players may be credited for the $2 rake fee collected as a result of Hand 3A when utilizing the inventive method ODR (OCOT variant) vs. the conventional methods WRR and CRR, respectively.

TABLE 3A

| Revenue Crediting Method | Player-Amount Credited | Player-Amount Credited | Player-Amount Credited |
|---|---|---|---|
| WRR | P3-Ø | P4-$2.00 | n/a |
| CRR | P3-$1.00 | P4-$1.00 | n/a |
| ODR (OCOT) | P1-$0.95 | P3-$0.05 | P4-$1.00 | wherein "n/a" = "not applicable"

As can be appreciated from reviewing the data of the above Table 3A, in accordance with some embodiments the amounts credited to a given player as his contribution to the rake may eventually become fractions of a monetary unit (e.g., fractions of a cent or other currency). The algorithm used in the ODR method utilizes virtual amounts of currency or virtual monetary units (not physical wagering chips or tokens), which easily allows for tracking and attributing fractional amounts.

Figure 5:
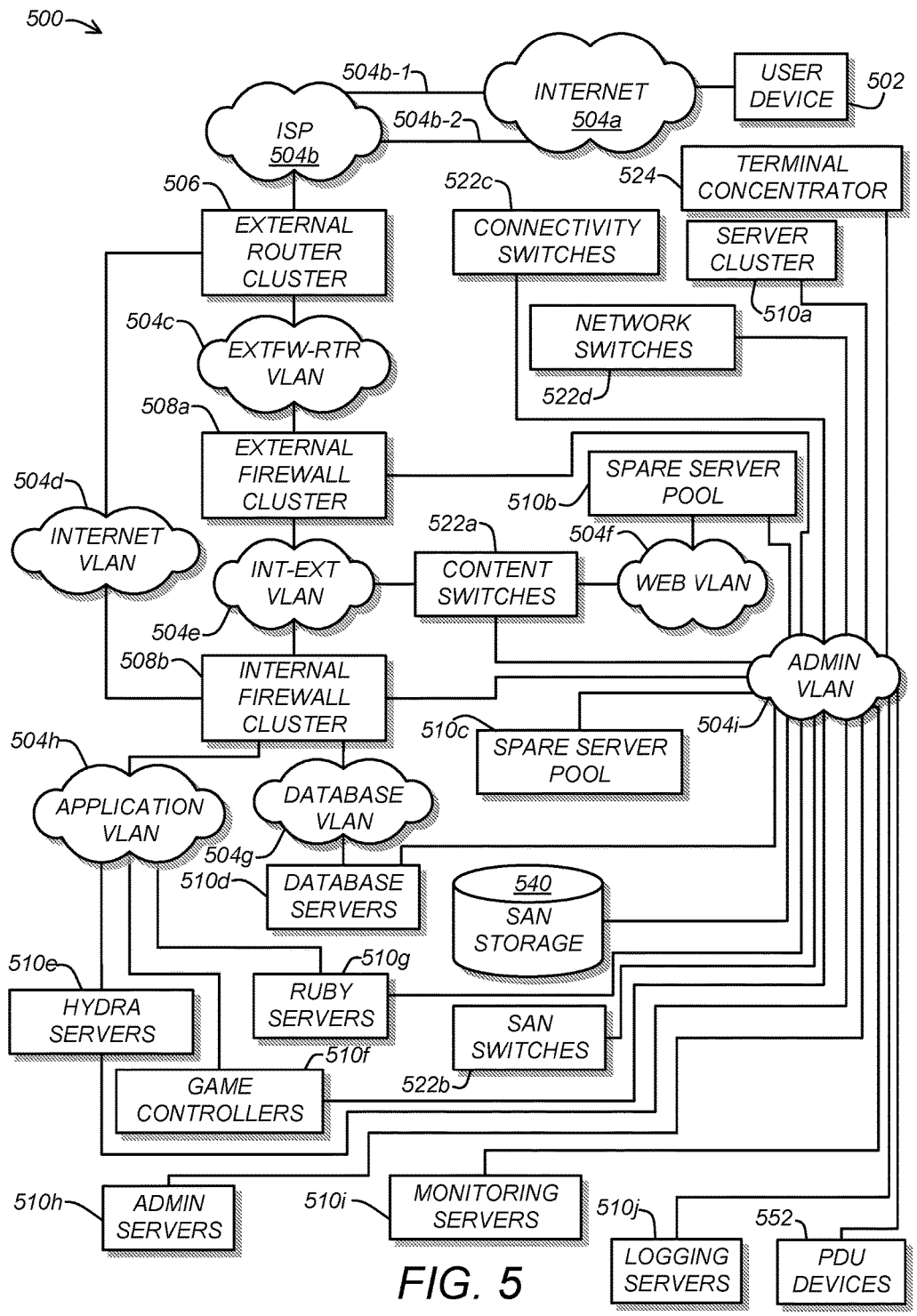
FIG. 5 is a block diagram of a system according to some embodiments.
Figure 6:
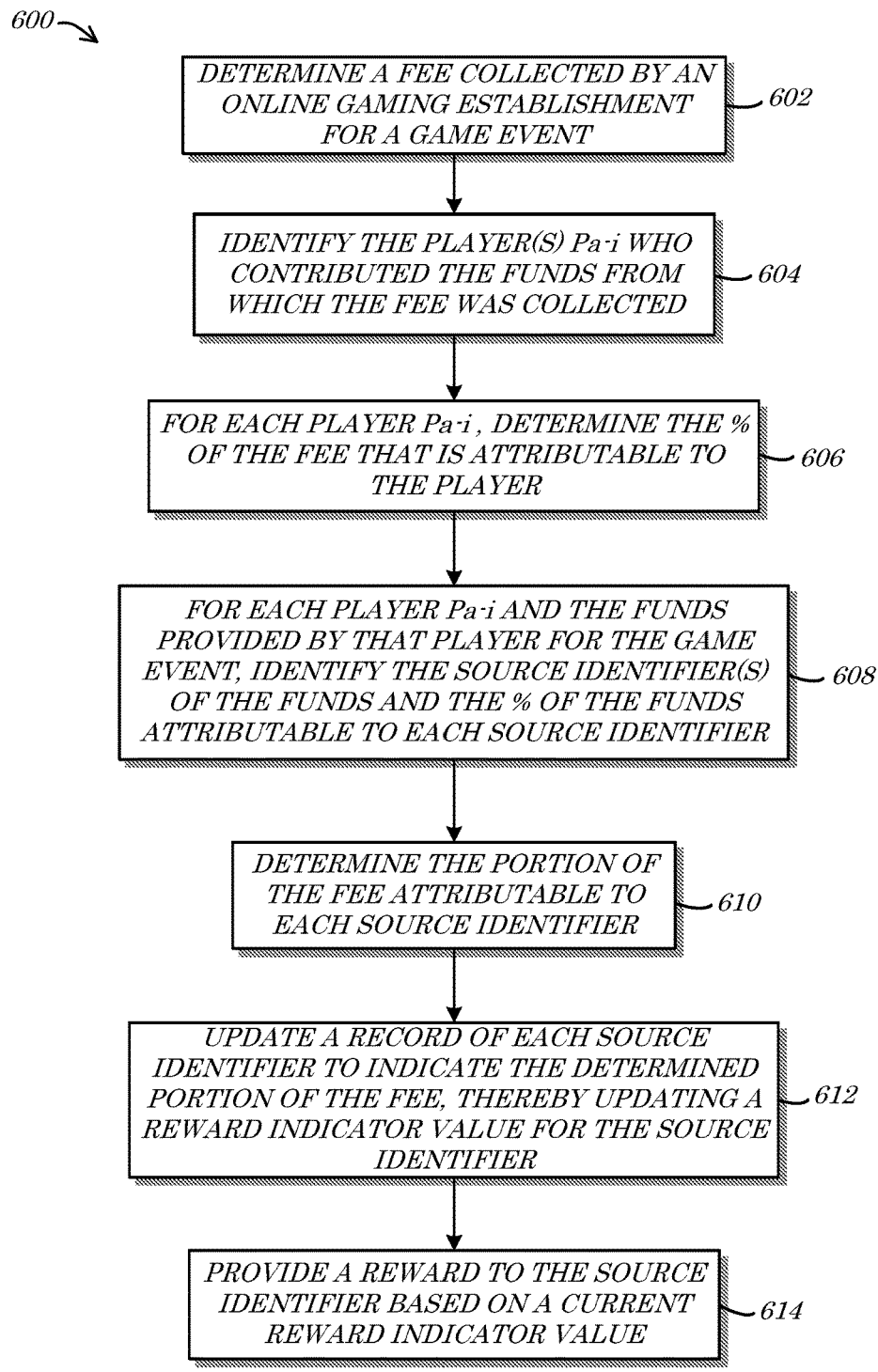
FIG. 6 is a flow diagram of an example process, in accordance with some embodiments.

Turning now to FIG. 6, illustrated therein is an example method 600 for determining how to credit players for a fee (e.g., a rake or tournament entry fee) collected by a gaming establishment. The processing of the fee for Hand 3A of Example A will be described with reference to method 600 in order to illustrate one example method for crediting players for the fee in a manner consistent with some embodiments described herein. In some embodiments, the method 600 may be performed and/or implemented by and/or otherwise associated with one or more specialized and/or computerized processing devices. For example, the method 600 may be performed by at least one of the systems or apparatus of FIG. 1, FIG. 2, FIG. 3 and/or FIG. 5 herein. The method 600 may comprise, for example, a routine or sub-routine of a rake credit allocation program such as program 310b of FIG. 3. In another example, the method 600 may be performed by other specialized computers, computer terminals, computer servers, computer systems and/or networks, and/or any combinations thereof (e.g., by one or more online gaming company and/or online gaming player processing devices). In some embodiments, the method 600 may be embodied in, facilitated by, and/or otherwise associated with various input mechanisms and/or interfaces. In some embodiments, the method 600 may be carried out by a processor of a game application delivery controller that is in communication with a game server cluster or other servers of an online game provider. The method 600 may be carried out by the processor of the game application delivery controller in order to facilitate embodiments described herein.

The process and/or flow diagrams described herein do not necessarily imply a fixed order to any depicted actions, steps, and/or procedures, and embodiments may generally be performed in any order that is practicable unless otherwise and specifically noted. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

Referring now to the steps of method 600, in step 602 the fee collected by an online gaming establishment for a game event is determined. In the particular Example A and Hand 3A thereof, step 602 comprises determining (e.g., based on data 408C of FIG. 4C) that a $2 fee is being collected. In accordance with one embodiment, method 600 credits a player for the % of the total pot amount which came from money for which the player was an original depositor. Therefore, in step 604, the player(s) who contributed the funds (in the case of Hand 3A, the wagers) from which the fee determined in step 602 are identified. In the example of Hand 3A, step 602 would result in identifying player P3 and player P4 as having made the wagers from which the fee determined in step 602 is collected. In step 606, for each player identified in step 604, the percentage of each player's contribution to the fee is determined. In accordance with some embodiments, each player's contribution to the fee is proportional to that player's contribution to the total pot amount. In the example of Hand 3A, each player P3 and P4 contributed 50% of the pot and would therefore be determined in step 606 to be associated with 50% of the fee determined in step 602.

Next, in step 608, for each player identified in step 604 and particularly for the wager amounts provided by each player, the source identifiers for the wager amount (e.g., the source identifiers for that portion of each player's wagering stack that was utilized for the wager) are identified. In the example of Hand 3A: (i) as indicated in data 402C for player P3, $19 of player P3's $20 wager corresponded to source identifier P1 and $1 of the wager corresponded to source identifier P3; and (ii) as indicated in data 404C for player P4, all $20 of player P4's wager corresponded to source identifier P4. Since the total pot amount for Hand 3A was $40, source identifier P1 is determined to have contributed 47.5% of the total pot amount ($19 of $40 is 47.5%), source identifier P3 is determined to have contributed 2.5% of the total pot amount ($1 of $40 is 2.5%) and source identifier P4 is determined to have contributed 50% of the total pot amount ($20 of $40 is 50%).

In step 610, the portion of the fee determined in step 602 that is attributable to each source identifier is determined. In accordance with some embodiments, the % of the fee collected by the gaming establishment attributable to a given source identifier is determined to be equal to the % of the total pot amount attributable to that source identifier. Accordingly: (i) player P1 is credited with 47.5% of the $2.00 rake amount ($0.95), since 47.5% of the pot amount for Hand 3A was made with money for which player P1 was the original depositor (even though this money was actually wagered by player P3, who previously won that money from player P2, who himself had won that money from player P1); (ii) player P3 is credited with 2.5% of the $2.00 rake amount ($0.05), since 2.5% of the pot amount for Hand 3A was made with money for which player P3 was the original depositor (player P3 is wagering with money he originally deposited, not money he won from some other player); and (iii) player P4 is credited with 50% of the $2.00 rake amount ($1.00), since 50% of the pot amount for Hand 3A was made with money player P4 originally deposited. These amounts, as calculated in accordance with the above-described methodology, are indicated in data 412C and in the last row of Table 3A above.

In step 612, a record corresponding to each source identifier identified in step 608 is updated to reflect the amount of the fee of step 602 that is to be credited to that source identifier. Accordingly, in the example of Hand 3A, a record corresponding to player P1 (identified by source identifier P1) may be accessed and the information therein may be updated to reflect that player P1 is credited with $0.95 of the rake fee collected for Hand 3A. Similar updates may be made to records corresponding to player P3 and player P4, respectively. In some embodiments, information defining the game event based on which an update to such a record is being made may also be stored in the record. For example, at least one of the following may be stored in the record of a given source identifier: (i) information about the time Hand 3A was played and/or resolved (e.g., a time stamp); (ii) identifiers of the player(s) who participated in the Hand 3A; (iii) an indication of each wager amount made and an identifier of the player who made it; and (iv) an indication of the player who won the hand. In accordance with some embodiments, players may be rewarded based on their contributions to the revenue of a casino. Thus, in some embodiments, updating a record to indicate that a source identifier (and therefore player corresponding to that source identifier) has been credited with a fee collected by a gaming establishment may comprise increasing a reward indicator (an indicator or value based upon which rewards, benefits or prizes are provided to the player).

As can further be appreciated from a review of the data in Table 3A, player P1 is yet again being credited with a contribution to a rake collected by the gaming establishment, even though player P1 is not participating in the current hand and the player who is wagering on the hand with money which was originally deposited with the gaming establishment by player P1 is not a player who directly won the money from player P1. Thus, the original depositor of money being wagered continues to be credited when that money is wagered, down a chain of players who have subsequently won that money, even if they have not won it directly from original depositor.

Continuing with Example A and referring now to FIG. 4D, player P2 and player P4 now play against each other in Hand 4A. As illustrated in the wagering stack composition comprising data 402D, Hand 4A is the very next game event player P4 is participating in after his win in Hand 3A. As indicated in data 406D, player P4 wagers $20 on hand 4A. Since the OCOT variant of the ODR method is being used and the wager value is being removed from the wagering stack top-to-bottom (as indicated by the downward arrow to the right of data 402D) player P4's $20 wager is composed of $18.05 for which the source identifier is P1 (money player P4 won which may be traced back as having originally been deposited with the gaming establishment by player P1), $0.95 for which the source identifier is P3 (money player P4 won which may be traced back as having originally been deposited with the gaming establishment by player P1) and $1.00 for which the source identifier is P4 (money originally deposited with the gaming establishment by player P4).

With respect to player P2, as illustrated in the wagering stack composition comprising data 404D, Hand 4A is the very next game event player P2 is participating in after his loss to player P3 in Hand 2A (at the beginning of Hand 2A, the top most $98.50 portion of player P2's wagering stack corresponded to source identifier P1 but player P3 wagered and lost $20 in hand 2A so his stack now reflects that the top most $78.50 of his wagering stack corresponds to source identifier P1). Since the OCOT variant of the ODR method is being used and the wager value is being removed from the wagering stack top-to-bottom (as indicated by the downward arrow to the right of data 404D) player P2's $20 wager is entirely composed of value for which the source identifier is P1 (since $78.50>$20). In accordance with some embodiments and based on the wager of player P2, an additional 50% of the pot amount is attributable to money for which player P1 is the original depositor.

It can be appreciated from the above description and the data illustrated in FIG. 4D that much of the money being wagered in Hand 4A was originally deposited with the gaming establishment by player P1. Data 408D indicates that the entire pot amount is $40. Data 410D indicates that the rake fee collected by the gaming establishment from this pot is $2 (5% of the pot, in accordance with the rules of the particular game being played). Data 412D indicates how players are credited with the $2 rake fee, based on the source identifiers corresponding to the wagers from which the rake fee was collected. In particular, data 412D indicates that player P1, despite not having directly participated in Hand 4A, is credited for $1.9025 of the $2 rake fee. Player P3 (also despite not having directly participated in Hand 4A) is credited with $0.0475 of the rake fee and player P4 is credited with $0.05 of the rake fee.

The calculation of the amounts in data 412D bears some explanation. Based on the fact that $18.05 of player P4's wager corresponds to source identifier P1 (as explained above), it follows that at least 45.125% of the pot amount corresponds to source identifier P1 ($18.05 is 45.125% of $40). Additionally, since all of player P2's wager corresponds to source identifier P1, an additional 50% of the pot amount is attributable to source identifier P1. Thus, 95.125% of the $40 pot amount (and thus, in accordance with some embodiments, 95.125% of the $2 rake fee collected by the gaming establishment) is attributable to player P1. Since 95,125% of $2 is $1.9025, this is the amount of the rake fee attributable to player P1. In accordance with the philosophy behind the ODR method, a player continues to be credited with the money he originally deposited with the gaming establishment even after losing it to another player and not directly wagering with it anymore, so long as it continues to be wagered and thus continues to contribute to the revenue of the gaming establishment.

Table 4A below offers a comparison of how players may be credited for the $2 rake fee collected as a result of Hand 4A when utilizing the inventive method ODR (OCOT variant) vs. the conventional methods WRR and CRR, respectively.

TABLE 4A

| Revenue Crediting Method | Player-Amount Credited | Player-Amount Credited | Player-Amount Credited |
|---|---|---|---|
| WRR | P4-Ø | P2-$2.00 | n/a |
| CRR | P2-$1.00 | P4-$1.00 | n/a |
| ODR (OCOT) | P1-$1.9025 | P3-$0.0475 | P4-$0.05 |

As can be appreciated from reviewing the data of the above Table 4A, in accordance with some embodiments the player who is an original depositor of money with a gaming establishment may be credited with contributing to the gaming establishment's revenues long after he has lost the money he deposited if other players continue to wager with that money. Thus, in the data of Table 4A, is shown that player P1 is credited with over 95% of the rake revenue, because over 95% of the money in the pot was originally deposited with the gaming establishment by player P1.

Upon completion of the four hands illustrated in Example A, the three different methodologies being compared result in startlingly different results, as summarized in Table 5A:

TABLE 5A

| Revenue Crediting Method | Total Rake Collected | Amount Credited to Player 1 | Amount Credited to Player 2 | Amount Credited to Player 3 | Amount Credited to Player 4 |
|---|---|---|---|---|---|
| WRR | $9.00 | $0 | $5.00 | $2.00 | $2.00 |
| CRR | $9.00 | $1.50 | $3.50 | $2.00 | $2.00 |
| ODR (OCOT) | $9.00 | $5.3525 | $1.50 | $1.0975 | $1.05 |

The amount of rake collected by the gaming establishment is the same under any of the three methods. It is the amount credited to the players which differs. The amount credited to the players (which, as discussed above, impacts the awards or incentives offered to the players and/or payments made to business partners); thus, the different methodologies may have a significant impact on which players are rewarded or incentivized under a given program or the amount of payments made to business partners. For example, if a gaming establishment were to apply the WRR method, it is clear from the data in Example A that players who are typically winners would be rewarded much more than players who are losers. This result may further discourage players who are already unhappy from lack of winnings from returning to the gaming establishment. Yet a player who loses money he originally deposited with the gaming establishment is a player the gaming establishment should encourage the return of, since this player's losses fuel the wagers of winning players and contribute to the revenue of the gaming establishment for much longer than just the hand in which the player lost the money.

A goal and result of applying applicants' ODR (OCOT) method is to reward players whose deposits of money with the gaming establishment continue to contribute revenue to the casino (e.g., because the money lost by a player on a wager continues to contribute to a rake collected by the casino when they are wagered by player who win that money), irrespective of whether the player won or lost. The data of Example A illustrates that the ODR method accomplishes this goal: player P1 only played one hand (Hand 1) and lost, yet is rewarded more than the other players who played more hands and won relatively more money because the method acknowledges and rewards player P1 for the money he deposited with the gaming establishment (which he wagered and lost in Hand 1) which continues to contribute to the revenue of the gaming establishment. It should be noted that both the WRR and the CRR methods rewards players based on the number of hands played (and the WRR method is even further dependent on the number of hands won). Applicant's inventive ODR method, on the other hand, rewards players based on the number of hands in which money which is originally deposited by a player contributes to the revenue of the gaming establishment (whether wagered by the originally depositing player or another player).

The following table 6A provides an additional viewpoint for how the four players P1 through P4 may be credited over the course of each of the four hands of Example A using the three different methods (again, the WRR and the CRR methods being conventional methods and the ODR method being an inventive method invented by Applicants and described herein as an improvement over the conventional methods). Looking at the hands in which a player is credited with some amount greater than zero and recognizing that a notation of "*" denotes hands in which a player directly placed a wager, it can again be appreciated that Applicant's inventive ODR method is the only method in which a player may be credited for contributing to revenue of a gaming establishment (and thus rewarded for such contributions) even in hands for which the player did not actively place a wager.

TABLE 6A

|  | Method | Hand 1A | Hand 2A | Hand 3A | Hand 4A | Total over all Hands |
|---|---|---|---|---|---|---|
| Player P1 | WRR | 0* | 0 | 0 | 0 | 0 |
|  | CRR | $1.50* | 0 | 0 | 0 | $1.50 |
|  | ODR | $1.50* | $1.00 | $0.95 | $1.9025 | $5.3525 |
| Player P2 | WRR | $3.00* | 0* | 0 | $2.00* | $5.00 |
|  | CRR | $1.50* | $1.00* | 0 | $1.00* | $3.50 |
|  | ODR | $1.50* | 0* | 0 | 0* | $1.50 |
| Player P3 | WRR | 0 | $2.00* | 0* | 0 | $2.00 |
|  | CRR | 0 | $1.00* | $1.00* | 0 | $2.00 |
|  | ODR | 0 | $1.00* | $0.05* | $0.0475 | $1.0975 |

TABLE 6A-continued

|  | Method | Hand 1A | Hand 2A | Hand 3A | Hand 4A | Total over all Hands |
|---|---|---|---|---|---|---|
| Player P4 | WRR | 0 | 0 | $2.00* | 0* | $2.00 |
|  | CRR | 0 | 0 | $1.00* | $1.00* | $2.00 |
|  | ODR | 0 | 0 | $1.00* | $0.05* | $1.05 |

(wherein * denotes a hand in which a player directly placed a wager on; OCOT variant of ODR being applied)

Example B

Turning now to another example ("Example B", a plurality of hands in a poker game are tracked to illustrate how revenue contributions of four different players (P1, P2, P3 and P4) are credited to the players over a course of the hands in a poker game (in which example only two of the four players participate in any given hand). As compared to the example data of Example A above and described with reference to FIGS. 4A-4D, in the illustrative hands of Example B (i) the player P2 wins less on the first hand; and (ii) the MCFP and PCOT variants of ODR method are applied (in Example A, only the OCOT variant of the ODR method had been illustrated). The following should be noted with respect to the description of Example B: (i) as in Example A, the term "stack" is intended to convey a meaning both in the poker sense (i.e. chip stack, such as a virtual chip stack) and the computer programming sense (i.e. a last-in-first-out (LIFO) data structure); (ii) square brackets, [ ], denote an ordered list or stack; (iii) curly brackets, { }, denote an unordered set; and (iv) "∞" means "infinite", or "arbitrarily large."

Referring now to Example B and Hand 1B, player P1 and player P2 participate, each wagering $10.00 (i.e., $20 total pot amount). As a result of Hand 1B player P2 wins. Thus, $19.00 is added to player P2's wagering stack and the gaming establishment collects $1.00 (5% of total pot amount). Assuming in this first hand both players are playing with their own money (i.e., not money they have previously won from other players), the players may be credited based on the rake amount collected for Hand 1B as indicated in Table 1B, which compares how players would be credited for the rake amount of Hand 1B under the conventional WRR and CRR methods as well as three variants of the inventive ODR method.

TABLE 1B

| Revenue Crediting Method | Player-Amount Credited | Player-Amount Credited |
|---|---|---|
| WRR | P1-Ø | P2-$1.00 |
| CRR | P1-$0.50 | P2-$0.50 |
| ODR (OCOT) | P1-$0.50 | P2-$0.50 |
| ODR (MCFP) | P1-$0.50 | P2-$0.50 |
| ODR (PCOT) | P1-$0.50 | P2-$0.50 |

As with the result of Hand 1A described above, in the first hand of Example B there is no difference in which players are credited or the amounts credited to those players between the CRR method and the inventive ODR method (in any of the three variants of the ODR method).

At the resolution of this Hand 1B, once the $1.00 rake is collected and the $19.00 is provided to player P2's stack, player P2's "stack" (i.e., money available to player P2 for wagering) under each of the ODR method variants compared in Table 1B above may be represented as follows:

P2's OCOT stack=[$9.50 for which P1 is the original depositor, $9.50 for which player P2 is the original depositor, and ∞ for which player P2 is the original depositor];

P2's MCFP stack=[($9.50 for which player P1 is the original depositor +$9.50 for which player P2 is the original depositor), and ∞ for which player P2 is the original depositor];

P2's PCOT stack=[$9.50 for which player P2 is the original depositor, $9.50 for which player P1 is the original depositor, and ∞ for which player P2 is the original depositor]

Continuing with Example B, the next game event player P2 participates in is Hand 2B, wagering with his wagering stack as it is composed upon the resolution of Hand 1B. The other player participating in Hand 2B is player P3, who is wagering with his own money (i.e., the source identifier for all the value in player P3's wagering stack is player P3). Player P2 and player P3 each wager $20 (i.e., $40.00 total pot amount). Player P3 wins Hand 2B. Thus, $38.00 of the total pot amount is moved to player P3's wagering stack and the gaming establishment collects $2 in rake (5% of total pot amount).

Using the data defining the source identifiers of each of the wager amounts placed in Hand 2B, the original depositors or source identifiers for the wager made by player P2 may be broken down under each respective variant of the ODR method as follows: (i) OCOT is {$9.50 P1, $10.50 P2}; (ii) MCFP is {$9.50 P1, $10.50 P2}; and (iii) PCOT is {$9.50 P1, $10.50 P2}. Based on this analysis of player P2's wager and assuming player P3 bet with money he himself originally deposited with the gaming establishment rather than winnings from other players, players may be credited based on the rake amount collected for Hand 2B as indicated in Table 2B below.

TABLE 2B

| Revenue Crediting Method | Player-Amount Credited | Player-Amount Credited | Player-Amount Credited |
| --- | --- | --- | --- |
| WRR | n/a | P2-∅ | P3-$2.00 |
| CRR | n/a | P2-$1.00 | P3-$1.00 |
| ODR (OCOT) | P1-$0.475 | P2-$0.525 | P3-$1.00 |
| ODR (MCFP) | P1-$0.475 | P2-$0.525 | P3-$1.00 |
| ODR (PCOT) | P1-$0.475 | P2-$0.525 | P3-$1.00 |

The algorithms via which the players were credited using the three variants of the ODR method are akin to what was described above in Example A and thus will not be described in detail again, for purposes of brevity. Some of the highlights of the data of table 2B which should be noted, however, include: (i) in any of the three variants of the ODR method, player P1 is given credit for some rake revenue, since P2 was using P1's money to play, even though player P1 was not participating in Hand 2B; (ii) if player P2 is a consistent winning player, P2 might pay very little rake with his own deposited money; and (iii) revenue contribution amounts can eventually become fractions of a cent or other unit of value (which may easily be managed in the accounting and crediting of players because the algorithms use virtual amounts and are not limited to physical wagering tokens or chips).

Upon the resolution of this Hand 2B, once the $2.00 rake is collected and the $38.00 is provided to player P3, player P3's "stack" (i.e., money available to player P3 for wagering) under each of the ODR method variants compared in Table 2B above may be represented as follows:

Player P3's OCOT stack=[$9.025 for which player P1 is the original depositor, $9.975 for which player P2 is the original depositor, $19.00 for which player P3 is the original depositor, and ∞ for which player P3 is the original depositor];

Player P3's MCFP stack=[($9.025 for which player P1 is the original depositor +$9.975 for which player P2 is the original depositor +$19.00 for which player P3 is the original depositor), ∞ for which player P3 is the original depositor]

Player P3's PCOT stack=[$19.00 for which player P3 is the original depositor, $9.975 for which player P2 is the original depositor, $9.025 for which player P1 is the original depositor, and ∞ for which player P3 is the original depositor]

As can be appreciated from a review of the data in the above stack representations, while the amounts credited to each player are the same for each variant of the ODR method, the ordering of the amounts corresponding to the distinct players (ordering in terms of which will be wagered first) differs. The differing ordering of the amounts attributable to the different original depositor players is indicated by the placement and type (square or curly) of the brackets.

Continuing with Example B, the next game event in which player P3 participates is Hand 3B, using his wagering stack as it is composed upon the resolution of Hand 2B. The other player participating in Hand 3B is player P4, who is wagering with his own money (i.e., the source identifier for all the value in player P4's wagering stack is player P4). Player P3 and player P4 each wager $20 (i.e., $40.00 total pot amount). Player P4 wins Hand 3B. Thus, $38.00 of the total pot amount is moved to player P4's wagering stack and the gaming establishment collects $2 in rake (5% of total pot amount).

Using the data defining the source identifiers of each of the wager amounts placed in Hand 3B, the original depositors or source identifiers for the wager made by player P3 may be broken down under each respective variant of the ODR method as follows (in terms of which original depositor players are associated with which units of value or portions in the player's stack) under each respective variant of the ODR method: (i) OCOT is {$9.025 P1, $9.975 P2, $1.00 P3}; (ii) MCFP is {$4.5125 P1, $4.9875 P2, $10.50 P3}; and (iii) PCOT is {$1.00 P2, $19.00 P3}.

Based on this analysis of player P3's wager and assuming player P4 bet with money he himself originally deposited with the gaming establishment rather than winnings from other players, players may be credited based on the rake amount collected for Hand 3B as indicated in Table 3B below.

TABLE 3B

| Revenue Crediting Method | Player-Amount Credited | Player-Amount Credited | Player-Amount Credited | Player-Amount Credited |
| --- | --- | --- | --- | --- |
| WRR | n/a | n/a | P3-∅ | P4-$2.00 |
| CRR | n/a | n/a | P3-$1.00 | P4-$1.00 |
| ODR (OCOT) | P1-$0.45125 | P2-$0.49875 | P3-$0.05 | P4-$1.00 |
| ODR (MCFP) | P1-$0.225625 | P2-$0.249375 | P3-$0.525 | P4-$1.00 |
| ODR (PCOT) | P1-∅ | P2-$0.05 | P3-$0.95 | P4-$1.00 |

Upon the resolution of Hand 3B, once the $2.00 rake is collected and the $38.00 is provided to player P4, player P4's "stack" (i.e., money available to player P4 for wagering) under each of the ODR method variants compared in Table 3B above may be represented as follows:

Player P4's OCOT stack=[$8.57375 for which player P1 is the original depositor, $9.47625 for which player P2 is the original depositor, $0.95 for which player P3 is the original depositor, $19.00 for which player P4 is the original depositor, and ∞ for which player P4 is the original depositor];

Player P4's MCFP stack=[($8.57375 for which player P1 is the original depositor +$9.47625 for which player P2 is the original depositor +$0.95 for which player P3 is the original depositor +$19.00 for which player P4 is the original depositor), and ∞ for which player P4 is the original depositor];

Player P4's PCOT stack=[$19.00 for which player P4 is the original depositor, $18.05 for which player P3 is the original depositor, $0.95 for which player P2 is the original depositor, and ∞ for which player P4 is the original depositor].

Continuing with Example B, the next game event player P4 participates in after winning Hand 3B is Hand 4B, wagering with his wagering stack as it is composed upon the resolution of Hand 3B. The other player participating in Hand 4B is player P2, who is wagering with his wagering stack as it was composed upon the resolution of Hand 2B (which player P2 lost to player P3). Player P2 and player P4 each wager $20 (i.e., $40.00 total pot amount). Player P2 wins Hand 4B. Thus, $38.00 of the total pot amount is moved to player P4's wagering stack and the gaming establishment collects $2 in rake (5% of total pot amount).

Using the data defining the source identifiers of each of the wager amounts placed in Hand 4B based on the composition of each player's respective wagering stack at the time, the original depositors or source identifiers for the wagers made by players P2 and P4, respectively, may be broken down under each respective variant of the ODR method may be determined as described herein. For example, the original depositors for the wager made by player P4 may be broken down under each respective variant of the ODR method as follows: (i) OCOT is {$8.57375 P1, $9.47625 P2, $0.95 P3, $1.00 P4}; (ii) MCFP is {$4.286875 P1, $4.738125 P2, $0.475 P3, $10.50 P4}; and (iii) PCOT {$19.00 P4, $1.00 P3}. Using this data, the players may be credited based on the rake amount collected for Hand 4B as indicated in Table 4B.

TABLE 4B

| Revenue Crediting Method | Player-Amount Credited | Player-Amount Credited | Player-Amount Credited | Player-Amount Credited |
|---|---|---|---|---|
| WRR | n/a | P2-$2.00 | n/a | P4-Ø |
| CRR | n/a | P2-$1.00 | n/a | P4-$1.00 |
| ODR (OCOT) | P1-$0.4286875 | P2-$1.4738125 | P3-$0.0475 | P4-$0.05 |
| ODR (MCFP) | P1-$0.21434375 | P2-$1.23690625 | P3-$0.02375 | P4-$0.525 |
| ODR (PCOT) | P1-Ø | P2-$1.00 | P3-$1.00 | P4-$0.95 |

As the data of the hands comprising Example B illustrates, under the inventive ODR method, player P1 continues to be credited with a share of the rake revenue, because the money deposited by player P1 continues to circulate within the poker economy. Upon completion of the four hands illustrated in Example B, the three different methodologies being compared result in startlingly different results, as summarized in Table 5B:

TABLE 5B

| | Method | Hand 1B | Hand 2B | Hand 3B | Hand 4B | Total over all Hands |
|---|---|---|---|---|---|---|
| Player P1 | WRR | 0* | 0 | 0 | 0 | 0 |
| | CRR | $0.50* | 0 | 0 | 0 | $0.50 |
| | ODR (OCOT) | $0.50* | $0.475 | $0.45125 | $0.4286875 | $1.8549375 |
| | ODR (MCFP) | $0.50 | $0.475 | $0.225625 | $0.21434375 | $1.41496875 |
| | ODR (PCOT) | $0.50 | $0.475 | 0 | 0 | $0.975 |
| Player P2 | WRR | $1.00* | 0* | 0 | $2.00* | $3.00 |
| | CRR | $0.50* | $1.00* | 0 | $1.00* | $2.50 |
| | ODR (OCOT) | $0.50* | $0.525* | $0.49875 | $1.4738125* | $2.9975625 |
| | ODR (MCFP) | $0.50 | $0.525 | $0.249375 | $1.23690625 | $2.51128125 |
| | ODR (PCOT) | $0.50 | $0.525 | $0.05 | $1.00 | $2.075 |
| Player P3 | WRR | 0 | $2.00* | 0* | 0 | $2.00 |
| | CRR | 0 | $1.00* | $1.00* | 0 | $2.00 |
| | ODR (OCOT) | 0 | $1.00* | $0.05* | $0.0475 | $1.0975 |
| | ODR (MCFP) | 0 | $1.00 | $0.525 | $0.02375 | $1.54875 |
| | ODR (PCOT) | 0 | $1.00 | $0.95 | $0.05 | $2.00 |
| Player P4 | WRR | 0 | 0 | $2.00* | 0* | $2.00 |
| | CRR | 0 | 0 | $1.00* | $1.00* | $2.00 |
| | ODR (OCOT) | 0 | 0 | $1.00* | $0.05* | $1.05 |
| | ODR (MCFP) | 0 | 0 | $1.00 | $0.525 | $1.525 |
| | ODR (PCOT) | 0 | 0 | $1.00 | $0.95 | $1.95 |

(wherein * denotes a hand in which a player directly placed a wager on)

Referring to player P1 in particular, who only participated in one of the four hands of Example B, the data summarized in Table 5B illustrates that under any of the inventive ODR methods, player P1 would be credited more for contributing to the revenues of the gaming establishment than under either of the conventional methods WRR or CRR. As described earlier, since many gaming establishments based their player reward or incentive schemes on a value credited to a player based on revenue contributed by that player to the gaming establishment, a player who is credited a higher amount based on his revenue contributions will receive more benefits under a reward or incentive scheme if any of the ODR algorithms are utilized to determine how much to credit the player than if either the WRR or CRR methods are used. As also described earlier, some gaming establishments have business agreements in place under which they provide payments or other benefits to third parties (e.g., partners whose websites serve as portals via which players enter the online gaming establishment's website and participate in wagering games). Under some such business agreements, the third parties are provided with payments or other benefits based on a relative amount of revenue contributed to the gaming establishment by players who are referred or directed to the gaming establishment by the third party. It follows then that if an ODR variant algorithm were used to credit players for revenue contributed to the gaming establishment, then a third party who referred or directed player P1 to the gaming establishment would benefit more than if the either the conventional CRR or WRR methods were used. It can be appreciated that if a third party were to refer or direct thousands or tens of thousands of players such as player P1 (e.g., who lose most wagers or lose a large wager and cease wagering), the ODR algorithms would appropriately value such players (and third parties for referring or directing such players to the gaming establishment) rather than ignoring the meaningful contributions to the revenues of the gaming establishment that the losing player's wagers continue to make when re-wagered by other players (as the CRR and WRR methodologies do).

In summary, the methods and systems invented by Applicant and described herein provide for associating with a unit of monetary value originally deposited with a gaming establishment (e.g., deposited into a monetary account managed by or on behalf of the gaming establishment, such as by being transferred from a debit account or purchased with credit from a credit card account) is associated or tagged with a player identifier of the player who originally deposited that unit of value with the gaming establishment. In accordance with some embodiments, that player identifier operates to identify the source or original depositor for that unit of value (and may be referred to as a "source identifier" herein).

In accordance with some embodiments, the source identifier associated with a unit of value is persistent in the sense that as the unit of value (or a fraction or portion thereof) is transferred to a second player (e.g., by virtue of having been won from the original depositor player by the second player), a third player (e.g., by virtue of having been won from the second player by the third player), etc., the source identifier remains associated with the unit of value (or any portion thereof into which the unit of value may be broken up into in accordance with the various algorithms which may be used by a gaming establishment in calculating portions of value to be provided to different players participating in the games of the wagering establishment). The tagging of a unit of value (including any portion of which may be created as the unit of value is divided into smaller amounts) with such a source identifier in such a persistent manner allows for the methodologies and algorithms described herein: to attribute credit to the original depositing player of that unit of value each time the unit of value (or any portion thereof) is collected as revenue by the gaming establishment. These methodologies thus allow a gaming establishment to accurately apportion or credit to a player the benefit of that player's contributions to the revenue of the gaming establishment even if the player is not the one who directly caused the unit of value to be collected as revenue by the gaming establishment (e.g., by having wagered it in a game). These methodologies also allow a player to continue to be rewarded for contributing to the revenue of the gaming establishment long after the player has discontinued playing or has lost the unit of value to another player.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played. In accordance with some embodiments, the system 500 may be utilized to facilitate embodiments described herein. For example, system 500 may be utilized to (i) obtain or determine wagering data (e.g., how much each player participating in a multi-player online poker game has wagered); (ii) track, generate and update the composition of each player's wagering stack (e.g., track the value of each portion of a given player's wagering stack that is attributable to a player, and update such data as a player places wagers, wins or loses wagers and makes additional deposits to his wagering stack); (iii) determine results or outcomes for a game and updated or generate data for wagering stacks based therein; and/or (iv) calculate and update which players should be credited for fees collected by a gaming establishment (e.g., rake fees or tournament entry fees) based on source identifiers corresponding to the wagers or other payments from which such fees are collected.

In some embodiments, the system 500 may comprise a user device 502, a plurality of networks (and/or environments and/or layers) 504a-i (e.g., the Internet 504a, an ISP 504b, an External Firewall-Router (EXTFW-RTR) Virtual LAN (VLAN) 504c, an Internet VLAN 504d, an Internal-External (INT-EXT) VLAN 504e, a web VLAN 504f, a database VLAN 504g, an application VLAN 504h, and/or an administrator VLAN 504i), an external router cluster 506, a plurality of firewall clusters 508a-b (e.g., an external firewall cluster 508a and/or an internal firewall cluster 508b), a plurality of servers 510a-j (e.g., a server cluster 510a, a first spare server pool 510b, a second spare server pool 510c, database servers 510d, "hydra" servers 510e, game controllers 510f, ruby servers 510g, admin servers 510h, monitoring servers 510i, and/or logging servers 510j), a plurality of switches 522a-d (e.g., content switches 522a, Storage Area Network (SAN) switches 522b, connectivity switches 522c, and/or network switches 522d), a TC device 524, a SAN storage device 540, and/or one or more PDU devices 552.

According to some embodiments, any or all of the components 502, 504a-I, 506, 508a-b, 510a-j, 522a-d, 524, 540, 552 of the system 500 may be similar in configuration and/or functionality to any similarly named and/or numbered components described herein. Fewer or more components 502, 504a-I, 506, 508a-b, 510a-j, 522a-d, 524, 540, 552 (and/or portions thereof) and/or various configurations of the components 502, 504a-I, 506, 508a-b, 510a-j, 522a-d, 524, 540, 552 may be included in the system 500 without deviating from the scope of embodiments described herein. While multiple instances of some components 504a-I, 508a-b, 510*a-j*, 522*a-d* are depicted and while single instances of other components 502, 506, 524, 540, 552 are depicted, for example, any component 502, 504*a*-I, 506, 508*a-b*, 510*a-j*, 522*a-d*, 524, 540, 552 depicted in the system 500 may comprise a single device, a combination of devices and/or components 502, 504*a*-I, 506, 508*a-b*, 510*a-j*, 522*a-d*, 524, 540, 552, and/or a plurality of devices, as is or becomes desirable and/or practicable. Similarly, in some embodiments, one or more of the various components 502, 504*a*-I, 506, 508*a-b*, 510*a-j*, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of an entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches 522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j*.

In some embodiments, the server cluster 510*a* may comprise one or more servers and/or other electronic controller devices (e.g., blade servers) configured to provide online gaming data (e.g., interfaces and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise a virtual player (i.e., a player represented by software controlling betting decisions for a player position).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method for generating tags for virtual currency deposited with an online wagering establishment, the method comprising:

determining, by a processor of an online gaming server and for a game event of the online wagering establishment, a first wager amount selected by a first player participating in the game event;

removing, by the processor, the first wager amount from a first virtual wagering stack associated with the first player, the first virtual wagering stack comprising a first amount of virtual currency available to the first player for wagering and consisting of a plurality of portions, each portion being tagged with a distinct source identifier that uniquely identifies an original depositor of value comprising that portion such that a first portion of the plurality of portions is associated with a first source identifier and a second portion of the plurality of portions is associated with a second source identifier and wherein the first wager amount comprises the first portion and is therefore associated with the first source identifier;

determining, by the processor, that the first player has lost the first wager amount;

identifying, by the processor, a second player participating in the game event that has won at least a part of the first wager amount lost by the first player, thereby identifying a first win amount;

determining, by the processor and based on the first source identifier of the first portion of the first virtual wagering stack and the first wager amount, the first source identifier as corresponding to the first win amount;

generating, by the processor, at least one tag for the first win amount, the at least one tag identifying the first source identifier as corresponding to the first win amount;

adding, by the processor, the first win amount along with the at least one tag to a second virtual wagering stack, the second virtual wagering stack defining a second amount of virtual currency available to the second player for wagering;

determining, by the processor, a first fee collected by the online wagering establishment as a result of the game event, the first fee consisting of a percentage of the first wager amount and at least one second wager amount placed by the second player on the game event;

determining, by the processor and based on the first source identifier corresponding to the first portion of the first virtual wagering stack and the first wager amount, the first source identifier as corresponding to the first fee; and crediting at least a portion of the first fee to the first source identifier corresponding to the first fee, thereby generating a credit amount.

2. The method of claim 1, wherein the credit amount is proportional to a percentage of a total pot amount that the first wager amount comprises.

3. The method of claim 1, wherein the credit amount is a fraction of a whole unit of virtual currency.

4. The method of claim 1, further comprising:
updating a value of a reward indicator associated with the first source identifier based on the credit amount.

5. The method of claim 4, wherein the reward indicator is a factor for determining a value of a reward to be provided to the first player, the method further comprising:
providing the reward to the first player based on a current value of the reward indicator.

6. The method of claim 1, wherein the first source identifier identifies a player that did not participate in the game event.

7. The method of claim 1, wherein the game event is a round of an online poker game and the first fee is a rake fee comprising a percentage of a total pot for the game event.

8. The method of claim 1, further comprising:
determining that the first player has deposited his own funds into the first virtual wagering stack, thereby identifying an original depositor value for the first player;
adding the original depositor value to the bottom of the first virtual wagering stack of the first player, such that the original depositor value will be accessed last to fund any wagers placed by the first player;
generating a tag for the original depositor value, the tag identifying the first player as an original depositor of all virtual currency units comprising the original depositor value; and
storing the tag as corresponding to the original depositor value in a virtual representation of the first virtual wagering stack.

9. A system for facilitating an online wagering game based on generating tags which persistently indicate an original depositor of value into the system, the system comprising:
a processor;
a memory storing a program for directing the processor, the processor being operable with the program to:
determine, for a game event of an online wagering establishment, a first wager amount placed by a first player participating in the game event;
remove the first wager amount from a first virtual wagering stack associated with the first player, the first virtual wagering stack comprising a first amount of virtual currency available to the first player for wagering and consisting of a plurality of portions, each portion being tagged with a distinct source identifier that uniquely identifies an original depositor of value comprising that portion such that a first portion of the plurality of portions is associated with a first source identifier and a second portion of the plurality of portions is associated with a second source identifier and wherein the first wager amount comprises the first portion and is therefore associated with the first source identifier;
determine that the first player has lost the first wager amount;
identify a second player participating in the game event that has won at least a part of the first wager amount lost by the first player, thereby identifying a first win amount;
determine, based on the first source identifier of the first portion of the first virtual wagering stack and the first wager amount, the first source identifier as corresponding to the first win amount;
generate at least one tag for the first win amount, the at least one tag identifying the first source identifier as corresponding to the first win amount;
add the first win amount along with the at least one tag to a second virtual wagering stack, the second virtual wagering stack defining a second amount of virtual currency available to the second player for wagering;
determine a first fee collected by the online wagering establishment as a result of the game event, the first fee consisting of a percentage of the first wager amount and at least one second wager amount placed by the second player on the game event;
determine, based on the first source identifier corresponding to the first portion of the first virtual wagering stack and the first wager amount, the first source identifier as corresponding to the first fee; and
credit at least a portion of the first fee to the first source identifier corresponding to the first fee, thereby generating a credit amount.

10. The system of claim 9, wherein the credit amount is proportional to a percentage of a total pot amount that the first wager amount comprises.

11. The system of claim 9, wherein the credit amount is a fraction of a whole unit of virtual currency.

12. The system of claim 9, wherein the processor is further operable with the program to:
update a value of a reward indicator associated with the first player based on the credit amount.

13. The system of claim 12, wherein the reward indicator is a factor for determining a value of a reward to be provided to the first player, the processor being further operable with the program to:
provide the reward to the first player based on a current value of the reward indicator.

14. The system of claim 9, wherein the game event is a round of an online poker game and the first fee is a rake fee comprising a percentage of a total pot for the game event.

15. The system of claim 10, wherein the processor is further operable with the program to:
determine that the first player has deposited his own funds into the first virtual wagering stack, thereby identifying an original depositor value for the first player;
add the original depositor value to the bottom of the first virtual wagering stack of the first player, such that the original depositor value will be accessed last to fund any wagers placed by the first player;
generate a tag for the original depositor value, the tag identifying the first player as an original depositor of all virtual currency units comprising the original depositor value; and
store the tag as corresponding to the original depositor value in a virtual representation of the first virtual wagering stack.

16. A system for facilitating an online wagering game based on generating tags which persistently indicate an original depositor of value into the system, the system comprising:
a processor;
a memory storing a program for directing the processor, the processor being operable with the program to:
determine that a first player has deposited his own funds equaling a first amount of virtual currency into a first virtual wagering stack, the first virtual wagering stack comprising virtual currency that is available to the first player for wagering;

identifying the first player as an original depositor of the first amount of virtual currency;

identifying the first amount of virtual currency as a first original depositor value corresponding to the first player;

add the first original depositor value to the bottom of the first virtual wagering stack of the first player, such that the first original depositor value will be accessed last, relative to any other virtual currency comprising the first virtual wagering stack, to fund any wagers placed by the first player;

generate a first tag for the first original depositor value, the first tag identifying the first player as an original depositor of all virtual currency units comprising the first original depositor value, the first tag thereby identifying the first player as a source identifier of the first original depositor value;

determine that the first player has won a wager amount from a second player in a first game event, thereby identifying a first win amount;

identify at least one second source identifier corresponding to the first win amount, the at least one second source identifier identifying a third player who is an original depositor of virtual currency into a second wagering stack from which the first win amount was wagered;

add the first win amount to the first virtual wagering stack of the first player on top of any remains of the first original depositor value in the first virtual wagering stack, such that the first win amount will be accessed prior to the remains of the first original depositor value to fund any subsequent wagers placed by the first player; and store at least one second tag as corresponding to the first win amount, the at least one second tag identifying the third player as an original depositor of the first win amount;

determine a fee collected by a wagering establishment for the first game event, the fee being based at least on the first win amount;

credit the third player as having contributed to the fee.

17. The system of claim 16, wherein the third player did not participate in the first game event.

* * * * *